US012722914B2

(12) United States Patent
Shipley et al.

(10) Patent No.: US 12,722,914 B2
(45) Date of Patent: Sep. 1, 2026

(54) PALLETIZER SYSTEM WITH CENTRALIZED PALLETIZING PATTERNS

(71) Applicant: Toyota Automated Logistics Americas, LLC, Carmel, IN (US)

(72) Inventors: Colin Shipley, Bridgeton, MO (US); Geoff Schreiber, Maryville, IL (US); Kenneth David Naumann, Maryland Heights, MO (US)

(73) Assignee: Toyota Automated Logistics Americas, LLC, Carmel, IN (US)

( * ) Notice: Subject to any disclaimer, the term of this patent is extended or adjusted under 35 U.S.C. 154(b) by 383 days.

(21) Appl. No.: 18/455,776

(22) Filed: Aug. 25, 2023

(65) Prior Publication Data

US 2025/0066145 A1 Feb. 27, 2025

(51) Int. Cl.

| | |
|---|---|
| ***B65G 57/24*** | (2006.01) |
| ***B25J 9/16*** | (2006.01) |
| ***B65G 43/08*** | (2006.01) |
| ***B65G 61/00*** | (2006.01) |

(52) U.S. Cl.

CPC ............ *B65G 57/24* (2013.01); *B25J 9/1682* (2013.01); *B25J 9/1687* (2013.01); *B65G 43/08* (2013.01); *B65G 61/00* (2013.01); *B65G 2201/0267* (2013.01); *B65G 2203/0266* (2013.01); *G05B 2219/31042* (2013.01)

(58) Field of Classification Search

CPC ........ B65G 57/24; B65G 43/08; B65G 61/00; B25J 9/1682; B25J 9/1687

See application file for complete search history.

(56) References Cited

U.S. PATENT DOCUMENTS

| | | | |
|---|---|---|---|
| 6,055,462 A | 4/2000 | Sato | |
| 7,266,422 B1 | 9/2007 | DeMotte et al. | |
| 8,644,984 B2 | 2/2014 | Nagatsuka et al. | |
| 8,814,492 B2 * | 8/2014 | Perl | B65G 57/03 414/928 |
| 10,696,493 B1 | 6/2020 | Diankov et al. | |

(Continued)

FOREIGN PATENT DOCUMENTS

| | | | |
|---|---|---|---|
| CN | 114584934 A * | 6/2022 | H04W 4/06 |
| JP | 05111888 A * | 5/1993 | |

OTHER PUBLICATIONS

Yaskawa, Flyer—PalletSolver Palletising Software for MOTOMAN robots Retrieved from the Internet: https://www.yaskawa.eu.com/Global%20Assets/Downloads/Brochures_Catalogues/Robotics/software/Flyer_Software_PalletSolver_E_08.2015.pdf, 4 pages, Aug. 1, 2015.

(Continued)

*Primary Examiner* — Patrick H Mackey

(74) *Attorney, Agent, or Firm* — Woodard, Emhardt, Henry, Reeves, and Wagner, LLP

(57) ABSTRACT

A palletizing system includes one or more palletizers. A database is configured to maintain a stacking pattern library containing multiple stacking patterns for the palletizers. A computer is operatively connected to the database. The computer is configured to automatically select a stacking pattern for a selected one of the palletizers. In other words, the computer is configured to change the stacking pattern of one of the palletizers without changing the other palletizers. The database is configured to maintain unique palletizer identifiers used for identifying individual palletizers to promote expandability.

22 Claims, 19 Drawing Sheets

(56) References Cited

U.S. PATENT DOCUMENTS

| | | | | |
|---|---|---|---|---|
| 12,077,331 | B2 * | 9/2024 | Torum | B65G 57/08 |
| 2008/0131255 | A1 | 6/2008 | Hessler et al. | |
| 2014/0079524 | A1 * | 3/2014 | Shimono | G05B 19/41815 414/801 |
| 2020/0095069 | A1 * | 3/2020 | Choplin | B65G 54/02 |
| 2020/0206932 | A1 | 7/2020 | Song et al. | |
| 2022/0270286 | A1 * | 8/2022 | Yasuda | G05D 1/02 |
| 2022/0288787 | A1 * | 9/2022 | Dupree | B25J 9/1687 |
| 2025/0178200 | A1 * | 6/2025 | Kristensen | G06V 10/776 |

OTHER PUBLICATIONS

Fanuc, Flyer—PalletPRO Intelligent 3D simulation for palletising robots Retrieved from the Internet: https://www.fanuc.eu/~/media/files/pdf/products/robots/flyer/mfl-03462-palletpro/palletpro%20flyer.pdf?la=en, 2 pages, Jan. 1, 2018.

Abb, Operating manual Palletizing PowerPac Retrieved from the Internet: https://search.abb.com/library/Download.aspx?DocumentID=3HAC042340-001&LanguageCode=en&DocumentPartId=&Action=Launch, 400 pages, Jan. 1, 2020.

Esko, Web Page—Cape Pack Retrieved from the Internet: https://www.esko.com/en/products/cape-pack, 9 pages, Aug. 26, 2021.

Kuka, Web Page—KUKA.PalletTech Retrieved from the Internet: https://www.kuka.com/en-us/products/robotics-systems/software/application-software/kuka_pallettech, 8 pages, Aug. 26, 2021.

Tops Software, Web Page—Tops Pro Retrieved from the Internet: https://topseng.com/tops-package-design-pallet-configuration-software/, 10 pages, Aug. 26, 2021.

* cited by examiner

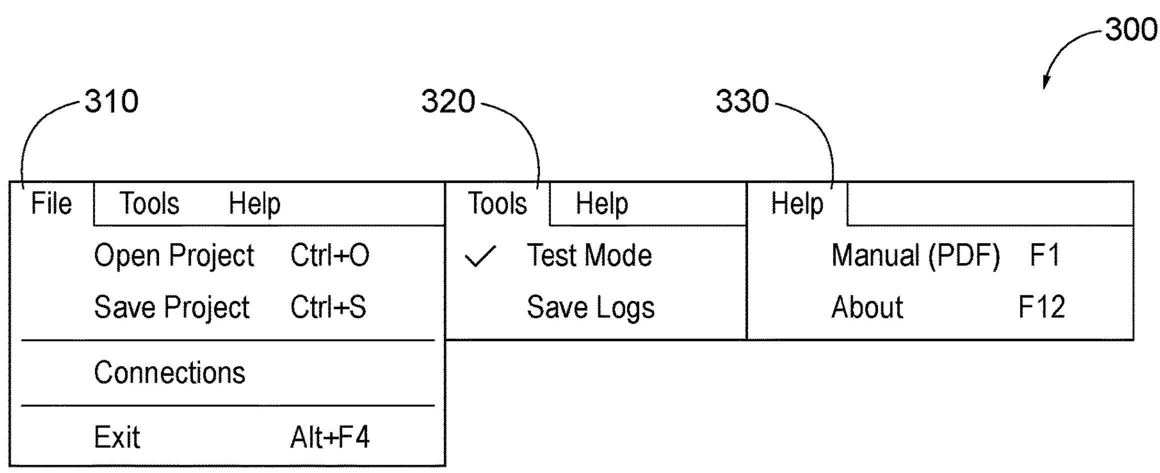
FIG. 3
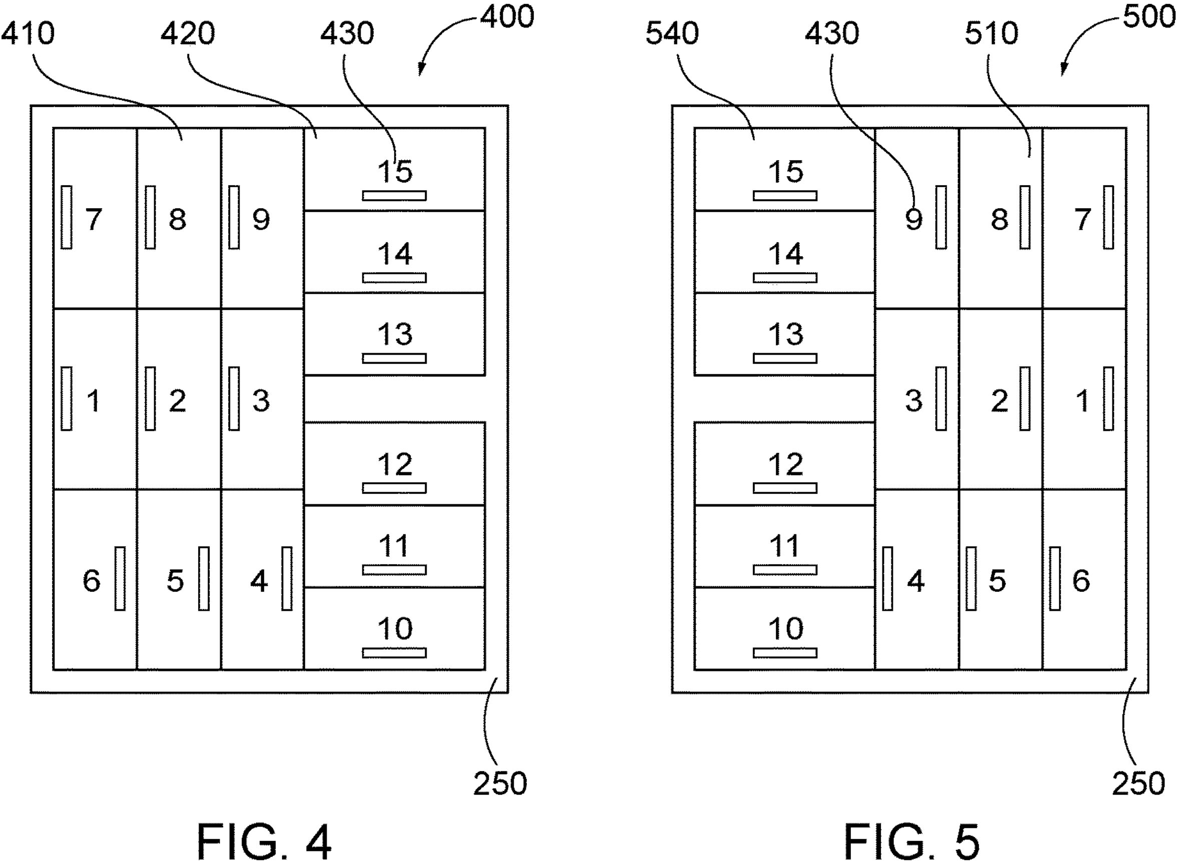
FIG. 4
FIG. 5

PALLETIZER SYSTEM WITH CENTRALIZED PALLETIZING PATTERNS

BACKGROUND

Stacking or palletizing items, such as boxes, on pallets can be a laborious and dangerous process when performed manually by humans. If the items are not properly stacked, some items may fall off the pallet before or during shipping. In recent years, automated palletizing systems, like palletizers and/or robots, have been developed to automate this process. However, unlike their human counterparts, these automated systems are not as adaptable in handling different packing conditions and environments.

Thus, there is a need for improvement in this field.

SUMMARY

It was found that most current palletizing software suites are either designed for operation on a single robot or are more generally designed so as to be not based on any robot. The per robot-based software approach is usually designed to take into account environmental factors within a cell where the robot operates. Software using the more generalized approach has the ability to export pattern data for robot consumption, but it was discovered this pattern data is not automated and cannot be directly loaded into a robot.

A unique palletizing software system or suite has been developed to address these as well as other issues. With this system, the palletizing stacking patterns of many different types of robots are centralized. In one form, the stacking patterns are stored in a central database with a stacking pattern library. Having the stacking patterns centralized simplifies pattern maintenance. Pattern changes can be made in one location regardless of the number of robots present. The system further uses non-dimensional data when storing patterns so as to decrease the number of patterns that need to be stored. The system is also expandable to accommodate additional robots. For example, when adding more robots to an existing site, the robots only need to have their Internet Protocol (IP) addresses added to a table in the database to start receiving stacking pattern data. In the settings for the system, the user can specify the allowable case overhang for the pallet (e.g., in the x and y dimensions). Through a web interface, the user can manually edit or set various parameters within the system. For instance, the robot IP address, tool types, and/or number of zones/actuators can be set. The tool types can for example include vacuum cup and/or clamp type tools. In one example, the patterns stored in the library are categorized by the type of tool from which the pattern was encoded. For instance, the pattern can include the number of zones and if the tool is a clamping or vacuum tool.

The system is further configured to automate the stacking pattern selection process. In one approach, the system automatically receives the requirements information from a programmable logic controller (PLC), and in response, the system selects a pattern to best fit the requirements. For instance, the system can select a pattern that best fits a number of cases per layer requirement. In another approach, the stacking pattern is directly referenced or requested. In one particular example, the user can either manually or automatically input the case dimensions of a variety of cases into the database. On a display for the system, the user can use a layout guide to set the pallet and case dimensions. The interim or final results from the stack pattern are then displayed on a results window of the display. The results window in one form shows the selected pattern along with identifying the number of cases per layer. For trouble shooting purposes, the results window is further configured to show the status. For a selected pattern, manual testing can be performed to show the stacking results. Typically, but not always, the system does not send the pattern data to the robot during this testing phase. When there is no communication with the PLC, the system in one variation switches to a test mode automatically until the connection with the PLC is restored. The user is also able to manually select the test mode. Manually selecting the test mode allows the manual entry of values for testing purposes.

Based on the stacking needs and case dimensional data as well as other factors, the system in one form automatically selects the stacking pattern for the robot. Some factors considered by the system during the selection process include case collision avoidance and avoidance of excessive overhang of the cases on the pallet. At the same time, the system in some cases attempts to maximize the number of cases in the allowed volume for the particular pallet, finds the best fit for a particular stacking layer, and/or picks a pattern that best matches the requirements for a particular situation. The system further has the capability to provide a pattern reference selection to the robot based on a reference pattern selected by a user or customer. In one form, the user selects a pattern to run for each product. The desired pattern for instance can be identified by an identifier such as a number or character. Before sending the pattern data to the robot, the system performs an interference check and overhang check to make sure no problems are created with the referenced pattern.

Typically, but not always, the PLC controls one or more robots. The system is configured to directly communicate with one or more PLCs. In one form, the system communicates with the PLCs using a tag server. In another form, the data is communicated using extensible markup language (XML) tags, but the data can be encoded or communicated in other ways. Some examples of the data or tags include product dimensions (e.g., length and width), pallet dimensions, a trigger tag signifying entry of the dimensions, the robot selected to run the stacking pattern (e.g., the IP address of the robot), the selected line or build location, the validation mode, pattern recall data, and/or read/write heartbeat data, to name just a few. Once more, the system is designed to automatically send the stacking pattern to the robot as indicated by or via the PLC. Upon receiving the stacking pattern, the robot stacks the cases or other items on the pallet in accordance with the stacking pattern.

The system is further designed to operate seamlessly with the robot and PLC. Normally, the pattern data is only sent at the start of the building of the first pallet. Consequently, the stacking pattern library stored in the centralized database can be updated at any time. When outages occur, the outage is reported, and the system is designed to automatically reconnect to the PLC and robot when possible. This in turn reduces the need for maintenance and makes the system easier to use.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a palletizing system.

Aspect 3 generally concerns the system of any previous aspect including one or more palletizers.

Aspect 4 generally concerns the system of any previous aspect in which the palletizers include robots.

Aspect 5 generally concerns the system of any previous aspect in which the robots include robotic arms.

Aspect 6 generally concerns the system of any previous aspect in which the palletizers include robotic type palletizers.

Aspect 7 generally concerns the system of any previous aspect in which the palletizers include in-line type palletizers.

Aspect 8 generally concerns the system of any previous aspect in which the palletizers include row-forming type palletizers.

Aspect 9 generally concerns the system of any previous aspect including a database.

Aspect 10 generally concerns the system of any previous aspect in which the database configured to maintain a stacking pattern library containing multiple stacking patterns for the palletizers.

Aspect 11 generally concerns the system of any previous aspect including a computer.

Aspect 12 generally concerns the system of any previous aspect in which the computer operatively connected to the database.

Aspect 13 generally concerns the system of any previous aspect in which the computer is configured to change the stacking pattern of one of the palletizers without changing the other palletizers.

Aspect 14 generally concerns the system of any previous aspect in which the database is configured to maintain unique palletizer identifiers used for identifying individual palletizers to promote expandability.

Aspect 15 generally concerns the system of any previous aspect in which the palletizer identifiers include internet protocol (IP) addresses of the palletizers.

Aspect 16 generally concerns the system of any previous aspect including a controller.

Aspect 17 generally concerns the system of any previous aspect in which the controller is configured to control at least one of the palletizers.

Aspect 18 generally concerns the system of any previous aspect in which the computer directly communicates with a controller that controls at least one of the palletizers.

Aspect 19 generally concerns the system of any previous aspect in which the controller is a programmable logic controller (PLC).

Aspect 20 generally concerns the system of any previous aspect in which the controller is configured to send stacking requirements information to the database.

Aspect 21 generally concerns the system of any previous aspect in which the stacking requirements information includes dimensional data and non-dimensional data.

Aspect 22 generally concerns the system of any previous aspect in which the controller is configured to send stacking requirements information to the computer.

Aspect 23 generally concerns the system of any previous aspect in which the computer is the controller.

Aspect 24 generally concerns the system of any previous aspect in which the computer is configured to perform a test mode for testing one or more stacking patterns.

Aspect 25 generally concerns the system of any previous aspect including an interface.

Aspect 26 generally concerns the system of any previous aspect including the interface operatively connected to the computer.

Aspect 27 generally concerns the system of any previous aspect including the interface operatively connected to the database.

Aspect 28 generally concerns the system of any previous aspect in which the interface configured to provide an interim and/or final result for the stacking pattern.

Aspect 29 generally concerns the system of any previous aspect in which the interface includes an input/output (I/O) device.

Aspect 30 generally concerns the system of any previous aspect in which the interface includes a display.

Aspect 31 generally concerns the system of any previous aspect in which the display is configured to display the interim and/or final result for the stacking pattern.

Aspect 32 generally concerns the system of any previous aspect in which the computer is configured to perform automated pattern selection.

Aspect 33 generally concerns the system of any previous aspect in which the computer is configured to automatically select a stacking pattern for a selected one of the palletizers.

Aspect 34 generally concerns the system of any previous aspect in which the computer is configured to automatically load the stacking pattern on the selected palletizer.

Aspect 35 generally concerns the system of any previous aspect in which the selected palletizer is configured to automatically stack items in accordance with the stacking pattern.

Aspect 36 generally concerns the system of any previous aspect in which the stacking pattern is loaded on the palletizer before building of a first pallet.

Aspect 37 generally concerns the system of any previous aspect in which the computer is configured to update the stacking pattern library in the database in real-time.

Aspect 38 generally concerns the system of any previous aspect in which the computer is configured to perform an overhang check for the stacking pattern before sending to the selected palletizer.

Aspect 39 generally concerns the system of any previous aspect in which the computer is configured to perform an interference check for the stacking pattern before sending to the selected palletizer.

Aspect 40 generally concerns the system of any previous aspect in which the computer is configured to maximize objects in an allowed volume for the stacking pattern.

Aspect 41 generally concerns the system of any previous aspect in which the computer is configured to allow automated pattern reference selection.

Aspect 42 generally concerns the system of any previous aspect in which the database is configured to store a reference stacking pattern that is identified by an identifier in the database.

Aspect 43 generally concerns the system of any previous aspect in which the computer is configured to push the reference stacking pattern to a designated palletizer based on receiving the identifier for the stacking pattern from a user.

Aspect 44 generally concerns the system of any previous aspect in which the computer is configured to perform an interference check before pushing the stacking pattern to the designated palletizer.

Aspect 45 generally concerns the system of any previous aspect in which the computer is configured to perform an overhang check before pushing the stacking pattern to the designated palletizer.

Aspect 46 generally concerns the system of any previous aspect in which the computer is configured to push the reference stacking pattern to the controller.

Aspect 47 generally concerns the system of any previous aspect in which the controller is configured to transmit dimensional data to the computer.

Aspect 48 generally concerns the system of any previous aspect in which the computer is configured to select a best match stacking reference pattern from the stacking library in the database.

Aspect 49 generally concerns the system of any previous aspect in which the computer is configured to send a reference pattern identifier for the best match stacking reference pattern to the controller.

Aspect 50 generally concerns the system of any previous aspect in which the controller is configured to transfer palletizing data to the palletizer based on the reference pattern identifier.

Aspect 51 generally concerns the system of any previous aspect in which the palletizer is configured to palletize items based on the palletizing data from the controller.

Aspect 52 generally concerns the system of any previous aspect in which the controller is configured to transmit non-dimensional data to the computer.

Aspect 53 generally concerns the system of any previous aspect in which the computer includes a server.

Aspect 54 generally concerns the system of any previous aspect in which the server is operatively coupled to the database.

Aspect 55 generally concerns the system of any previous aspect in which the server includes a processor and memory.

Aspect 56 generally concerns the system of any previous aspect including a network.

Aspect 57 generally concerns the system of any previous aspect in which the network operatively connects the server to the controller.

Aspect 58 generally concerns the system of any previous aspect in which the computer is operatively connected to the database over the network.

Aspect 59 generally concerns the system of any previous aspect in which the palletizing system has a centralized database configured to store stacking patterns for multiple palletizers.

Aspect 60 generally concerns the system of any previous aspect in which the stacking patterns include dimensional data.

Aspect 61 generally concerns the system of any previous aspect in which the stacking patterns include non-dimensional data.

Aspect 62 generally concerns the system of any previous aspect in which the stacking patterns include dimensional data and non-dimensional data about the items stacked in the stacking pattern.

Aspect 63 generally concerns a method.

Aspect 64 generally concerns the system or method of any previous aspect including receiving a first request for a first palletizer at a database that stores stacking patterns for multiple palletizers.

Aspect 65 generally concerns the system or method of any previous aspect including selecting a first stacking pattern from the database based on the first request.

Aspect 66 generally concerns the system or method of any previous aspect including sending the first stacking pattern from the database to the first palletizer.

Aspect 67 generally concerns the system or method of any previous aspect including palletizing at the first palletizer using the first stacking pattern.

Aspect 68 generally concerns the system or method of any previous aspect including receiving a second request for a second palletizer at the database.

Aspect 69 generally concerns the system or method of any previous aspect in which the first palletizer and the second palletizer are different palletizers.

Aspect 70 generally concerns the system or method of any previous aspect including selecting a second stacking pattern from the database based on the second request.

Aspect 71 generally concerns the system or method of any previous aspect in which the first stacking pattern and the second stacking pattern are different.

Aspect 72 generally concerns the system or method of any previous aspect in which the first stacking pattern and the second stacking pattern are the same.

Aspect 73 generally concerns the system or method of any previous aspect including sending the second stacking pattern from the database to the second palletizer.

Aspect 74 generally concerns the system or method of any previous aspect including palletizing at the second palletizer using the second stacking pattern.

Aspect 75 generally concerns the system or method of any previous aspect including sending the first request from a controller for the first palletizer to the database.

Aspect 76 generally concerns the system or method of any previous aspect in which the first request includes dimensional data.

Aspect 77 generally concerns the system or method of any previous aspect including selecting the first stacking pattern includes finding one or more patterns that best match the dimensional data.

Aspect 78 generally concerns the system or method of any previous aspect in which the first request includes non-dimensional data.

Aspect 79 generally concerns the system or method of any previous aspect including receiving the first stacking pattern from the database at the controller.

Aspect 80 generally concerns the system or method of any previous aspect including controlling operation of the first palletizer with the controller based on the first stacking pattern.

Aspect 81 generally concerns the system or method of any previous aspect including detecting abnormal communication with the controller.

Aspect 82 generally concerns the system or method of any previous aspect including entering a test mode upon the detecting abnormal communication.

Aspect 83 generally concerns the system or method of any previous aspect including receiving an instruction from a user to enter a test mode.

Aspect 84 generally concerns the system or method of any previous aspect including entering the test mode upon the receiving the instruction.

Aspect 85 generally concerns the system or method of any previous aspect including sending the first stacking pattern includes returning a reference pattern identifier to the controller.

Aspect 86 generally concerns the system or method of any previous aspect including providing interim and/or final results for the first stacking pattern at a first interface.

Aspect 87 generally concerns the system or method of any previous aspect including modifying the first stacking pattern based on user input from the interim and/or final results.

Aspect 88 generally concerns the system or method of any previous aspect in which the providing the interim and/or final results includes displaying the interim and/or final results on a display.

Aspect 89 generally concerns the system or method of any previous aspect including performing a preliminary pattern check of the first stacking pattern.

Aspect 90 generally concerns the system or method of any previous aspect in which the performing the preliminary pattern check includes checking for overhang and/or interference in the first stacking pattern.

Aspect 91 generally concerns the system or method of any previous aspect in which the performing the preliminary pattern check occurs before the providing the interim and/or final results.

Further forms, objects, features, aspects, benefits, advantages, and embodiments of the present invention will become apparent from a detailed description and drawings provided herewith.

BRIEF DESCRIPTION OF THE DRAWINGS

FIG. 3 is a screen rendering of a menu displayed in the FIG. 1 system.

FIG. 4 is a screen rendering of a stacking pattern shown on the FIG. 2 pattern management interface.

FIG. 5 is a screen rendering of another stacking pattern shown on the FIG. 2 pattern management interface.

DETAILED DESCRIPTION OF SELECTED EMBODIMENTS

Figure 1:
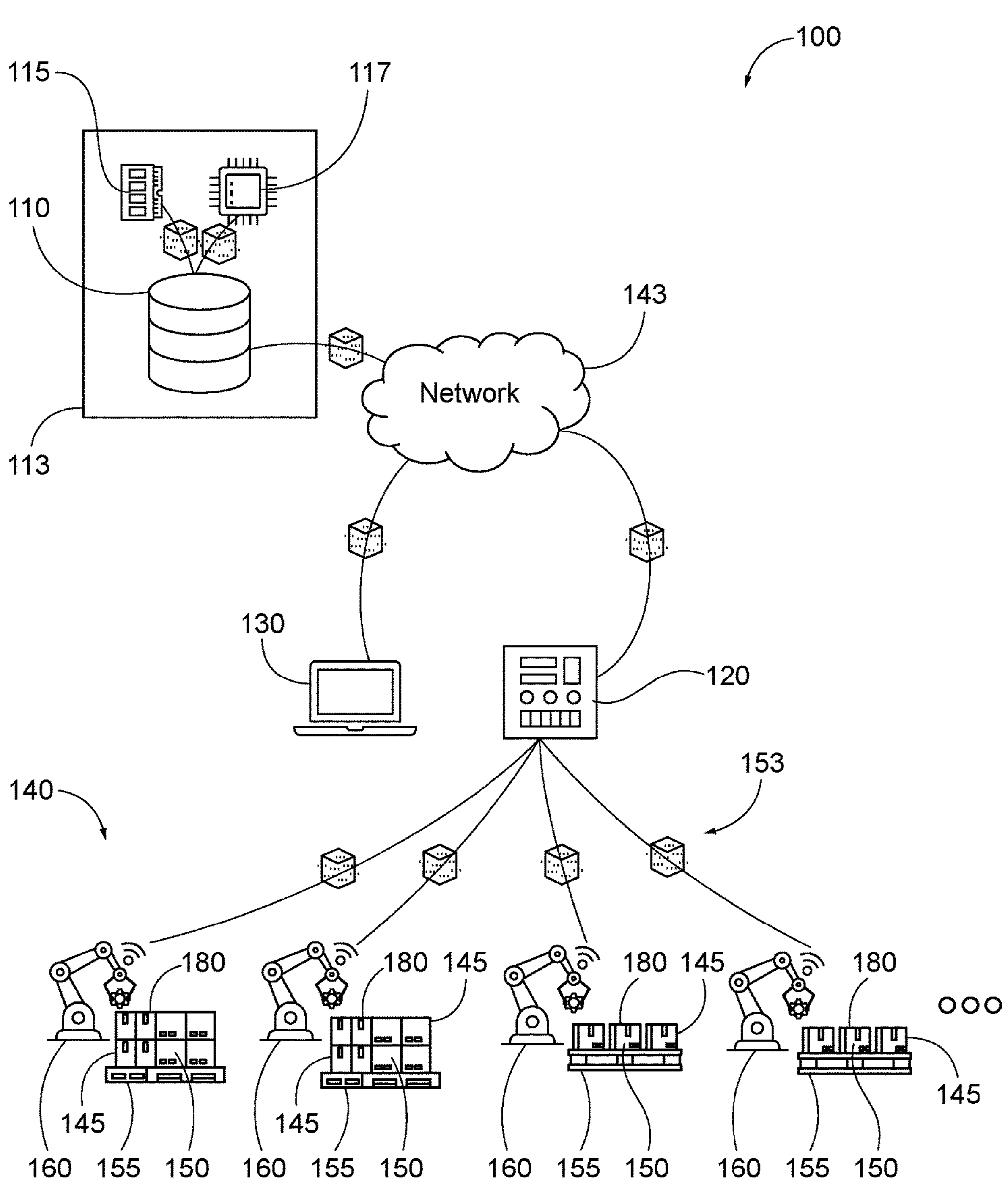
FIG. 1 is a diagram of a system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A system 100 according to one example is illustrated in FIG. 1. The system 100 includes a database 110. As should be recognized, the database 110 is coupled to a server 113 that contains memory 115 and at least one processor 117. The memory 115 and the processor 117 are operatively connected via the server 113 to facilitate the operations of the server 113. The system 100 further includes a controller 120, an interface 130, and one or more palletizers 140. In the example illustrated, the interface 130 is coupled to a computer 141 that includes one or more input/output (I/O) devices, such as a keyboard, mouse, display, and speakers. But it should be recognized that the interface 130 can be coupled to other devices such as a tablet, a smart phone, etc. The controller 120 includes a Programable Logic Controller (PLC) 142. But it should be recognized that the interface 130 can include other types of logic controllers. As shown, the database 110, the palletizers 140, and the computer 141 are able to communicate via a network 143. As should be recognized, other types of communication methods can be substituted for the network 143. In this way, information is transmitted and received by each component of the system 100. For example, a user inputs certain data into the computer 141, and then the computer 141 transforms the data into a stacking pattern 145 and sends the stacking pattern 145 to the PLC 142. In general, the stacking pattern 145 lays out a plan for the palletizer 140 to perform palletization of at least one object 150. The PLC 142 in turn sends the stacking pattern 145 to both the database 110 and the palletizers 140. The database 110 receives the stacking pattern 145 and stores the stacking pattern 145 for future uses. The palletizers 140 receive the stacking pattern 145 and execute the palletizing order in accordance with the stacking pattern 145.

According to one example, the database 110 is configured to store some or all of the stacking patterns 145. Having the stacking pattern 145 centralized simplifies pattern maintenance. Having the stacking pattern 145 centralized also allows pattern changes to be made in a single location regardless of the number of the palletizers 140 present. In one form, the database 110 stores the stacking pattern 145 as a non-dimensional data 153, such as a reference pattern ID. With the centralized storage of the non-dimensional data 153, the database 110 can be used as a library of palletizing options.

The system 100 in FIG. 1 is expandable to accommodate multiple and different types of palletizers 140. For example, when adding more palletizers 140 to an existing site to start receiving stacking patterns 145, the controllers 120 only need to have the Internet Protocol (IP) addresses of the palletizers 140 added to a table in the database 110. Each of the palletizers 140 can perform a different palletizing task on a pallet 155 according to the stacking pattern 145 the palletizer 140 receives. In the illustrated example, the palletizers 140 includes four robot arms 160. As should be appreciated, more and/or less robot arms 160 can be added into the system 100 in other variations. As shown, two of the robot arms 160 perform palletizing tasks different from the palletizing tasks received by the other two of the robot arms 160. By utilizing the non-dimensional data 153, the system 100 allows multiple palletizers 140 to utilize a single stacking pattern 145 for palletizing multiple objects 150 in different dimensions. As illustrated, the two robot arms 160 performing the same palletizing tasks in accordance with the stacking pattern 145 palletize different objects 150 on each of the pallets 155. It should be recognized, the objects 150 can be unpackaged products and/or the cases 180 containing packaged products. As can be expected, the unpackaged products and/or the cases 180 can have different dimensions.

In one form, the data is communicated via tag servers and robot communication plugins, but the data can be encoded or communicated in other ways such as by using extensible markup language (XML) tags. The system 100 allows the user to specify the necessary data for performing the palletization. For example, the user can input allowable overhang of the cases 180 on a particular pallet 155. In another example, the user can input the dimensions of the cases 180 for which the pallet 155 is used. The user can further specify the number of the cases 180 on a layer to achieve a desired unit count per pallet. According to one embodiment, the user can set the minimum number of the cases 180 on the floor of the pallet 155 to promote interlocking between the layers. Additionally or alternatively, the user can select the properties of the palletizer 140. According to one example, the properties of the palletizer 140 are automatically set. The properties of the palletizer 140 include, but not limited to, IP address, End of Arm Tool (EoAT), and/or number of zones/actuators. In particular, the EoAT includes, but not limited to, a vacuum cup and/or a clamp type tool.

The system 100 is further designed to operate seamlessly with the palletizers 140 and the controller 120. Normally, the stacking pattern 145 is only sent at the start of the building of the first pallet 155. Consequently, the library of the stacking pattern 145 stored in the database 110 can be updated at any time. When outages occur, the outage is reported, and the system 100 is designed to automatically reconnect to the controller 120 and the palletizers 140 when possible. This in turn reduces the need for maintenance and makes the system easier to use.

Figure 2:
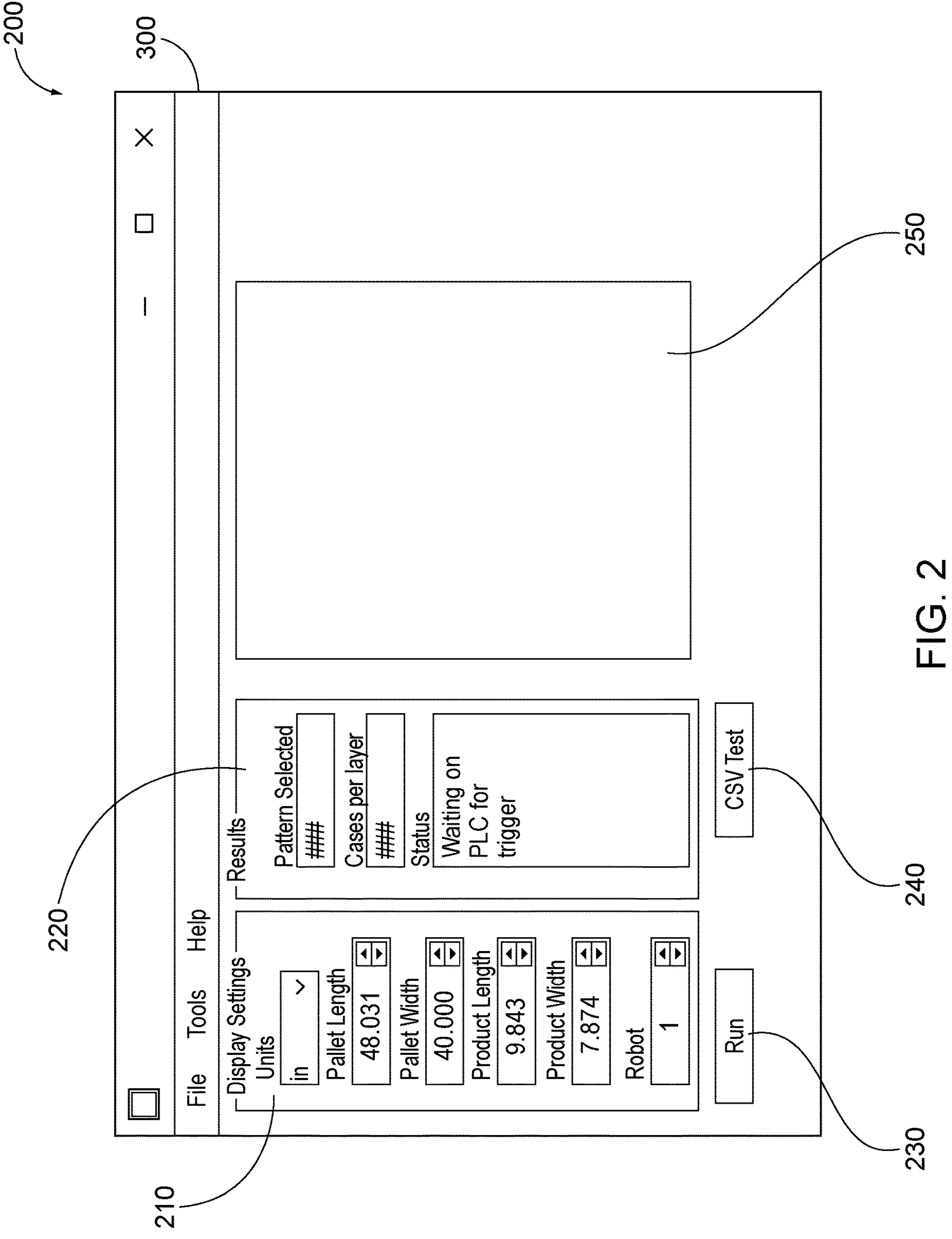
FIG. 2 is a screen rendering of a pattern management interface displayed in the FIG. 1 system.

FIG. 2 illustrates an example of a pattern management interface 200 shown on the computer 141. As should be appreciated, the pattern management interface 200 can be shown on other types of interfaces 130. As illustrated, the pattern management interface 200 incorporates a pattern management display setting area 210, a pattern management results area 220, a run button 230, a comma separated values test button (CSV test button) 240, a pattern image generation area 250, and a menu 300. The pattern management interface 200 allows the user to store and/or manage the stacking pattern 145 to be processed by the system 100 via the database 110 and the computer 141. In general, these features allow the user to observe and/or input information such as the task data, the status of the system 100 including the status of each component of the system 100, the visualization of the stacking pattern 145, and to allow the user to perform certain tests. The pattern management interface 200 in other variations can include extra and/or different features.

The pattern management display setting area 210 includes one or more input boxes for the user to enter necessary parameters, including, but not limited to, the length and width of the pallet 155 to be used, the length and width of the object 150 to be palletized, and the quantity of the palletizers 140 to be utilized. The user can also select and/or change the units of the parameters, including, but not limited to, millimeters, inches, and centimeters. As shown in FIG. 2, the pattern management display setting area 210 receives inputs of the necessary parameters of a single type of the case 180 to be palletized. But it should be recognized that the pattern management display setting area 210 can be adapted to receive inputs of the necessary parameters of multiple types of the cases 180.

The pattern management results area 220 is where the selected stacking pattern 145 is indicated along with the number of objects 150, such as the cases 180, per layer. Status of the system 100 is also shown for troubleshooting purposes. According to one example, when a request comes in with the desired parameters from the pattern management display setting area 210, the system 100 via the computer 141 checks which stacking pattern 145 will fit and not cause interferences and then selects the highest cases per load solution to indicate in the pattern management results area 220. The pattern management results area 220 can further operate in three different modes. In a resolve mode, the system 100 via the computer 141 then returns the non-dimensional data 153, such as the reference pattern ID, back to the PLC 142 and transfers the data to the indicated palletizer 140. In a validate or a test mode, the system 100 returns the non-dimensional data 153 back to the PLC 142 but does not load the non-dimensional data 153 to the palletizer 140. In a recall mode, the system 100 reads requested non-dimensional data 153 and loads the non-dimensional data 153 to the palletizer 140 after validating the non-dimensional data 153 does not exceed load size limits or has interferences.

The run button 230 allows the user to perform manual tests of input data. The pattern management results area 220 will then display the test result. Generally, the run button 230 is accessible only in the validate or the test mode. As should be expected, by clicking on the run button 230, the system 100 does not load the non-dimensional data 153 to the palletizer 140.

The CSV Test button 240 allows the user to open a spreadsheet, such as an Excel file, that is formatted to run a batch of testing data through the system 100. The pattern management results area 220 will then display the test result. Generally, the CSV Test button 240 is accessible only in the validate and/or the test mode. By clicking on the CSV Test button 240, the system 100 does not load the stacking pattern 145 to the palletizer 140. Besides using a spreadsheet file format, other types of data formats such as Optimized Row Columnar (ORC), Parquet, and/or Avro can also be used on other examples of the pattern management interface 200.

The pattern image generation area 250 displays the system 100 generated graphics showing how the load will be palletized. The pattern image generation area 250 provides a visualization of the stacking pattern 145 in combination with the desired parameters of the object 150 to be used. In one example, the pattern image generation area 250 displays a 2-Dimensional (2D) graphic. In another form, the pattern image generation area 250 displays a 3-Dimensional (3D) graphic.

An example of the menu 300 of the pattern management interface 200 is illustrated in FIG. 3 in detail. As shown, the menu 300 includes multiple drop-down tabs including, but not limited to, a file tab 310, a tools tab 320, and a help tab 330. In general, these tabs allow the user to open a project file, enter into a test mode, and/or access an operation manual.

The file tab 310 allows the user to open an existing project file to access the stacking pattern 145 and parameters. Once the existing project file is accessed, the user can overwrite any existing values if needed. Moreover, the file tab 310 allows the user to save a current project. In one form, the user can save the input parameters from the pattern management display setting area 210. In another form, the user can save both the parameters and the stacking pattern 145 that the system 100 generated. Generally, the saved projects are stored in the database 110. But the user may also choose to save the projects locally, such as in the computer 141. Additionally, the file tab 310 provides an option for the user to check the connections with other components of the system 100, including but not limited to the status of the palletizers 140. In one example, the status of the connection is shown in the pattern management results area 220. In another example, the status of the connection is shown in a different pop-up window. According to the illustrated example, the loading time of the connection status is no more than ten seconds. The file tab 310 further provides an option to exit the pattern management interface 200.

The tools tab 320 includes an option for the user to manually enter the test mode. As explained in FIG. 2, generally, the run button 230 and the CSV Test button 240 are accessible only in the test mode. Moreover, during the test mode and through the network 143, the system 100 returns the stacking pattern 145 back to the controller 120 for testing purposes but does not load the stacking pattern 145 to the palletizer 140 to perform palletization. The tools tab 320 further includes a save logs option. The save logs option allows the user using the computer 141 to save any operating data, including but not limited to communication events with the controller 120 and the application events with the system 100, in a special folder in the database 110. As should be appreciated, saving the data under the save logs function may also take place locally.

The help tab 330 incorporates a manual for the system 100. As shown, the manual is in PDF format. As should be appreciated, the manual may also be in other formats. The manual provides detailed instructions for the user using the interface 130 to operate the system 100 for palletization and/or other related tasks.

FIGS. 4 and 5 illustrate examples of 2D visualizations of the stacking patterns 145 that are shown on the pattern management interface 200. According to one example, the pattern management interface 200 is configured to export a graphic of the stacking pattern 145 and the interlock of the stacking pattern 145 to a set location, such as the pattern image generation area 250, for display purposes. In one example, the graphics are saved as, among other format options, a Portable Network Graphics (PNG) file. The PNG file is further named in the format that contains four sections: prefix, robot name, line name, and interlock. Under this naming method, all images start with a common prefix, for example, "ActPat." The communications between the palletizer 140 and the controller 120 utilize a tag name for identifying the palletizer 140. The robot name is obtained from the tag name, for example, "RBT1." The line name is the input value from the controller 120, for example, "L1." Finally, if the stacking pattern 145 stacks in an interlocking manner, the graphics then has a duplicated view of the stacking pattern 145 on each layer, and the file name ends with "Interlock." Additionally, each section is connected with each other with an underscore. A full file name example can be "ActPat_RBT1_L1_Interlock.png." The unique file name format provides efficient operations within the system 100, especially in the centralized data transmitting and storing processes. As should be appreciated, the aforementioned naming method of the graphic file is not meant to be the only one.

As illustrated in FIG. 4, a plurality of vertical placements 410 and a plurality of horizontal placements 420 are shown on the pattern image generation area 250. The vertical placements 410 and the horizontal placements 420 together represent a visualization of the stacking pattern 145. A pattern numeral 430 is assigned to each of the vertical placements 410 as well as to each of the horizontal placements 420. A baseline edge mark 440 is shown on each of the vertical placements 410 as well as on each of the horizontal placements 420. As should be recognized, the pattern numeral 430 and the baseline edge mark 440 are configured to facilitate the arrangement of the stacking pattern 145. Specifically, each pattern numeral 430 represents a particular placement, and each baseline edge mark 440 indicates a direction where the placement is aligned against.

FIG. 5 shows an interlocking pattern of the stacking pattern 145 in FIG. 4. In the illustrated example, the interlocking pattern includes the same number of vertical placements 410 and the same number of horizontal placements 420. But the layout of the stacking pattern 145 in FIG. 5 is horizontally opposite to the layout of the stacking pattern 145 in FIG. 4. Particularly, the baseline edge marks 440 in FIG. 5 are facing transverse (or perpendicular) to the direction of the baseline edge marks 440 in the original pattern in FIG. 4. It should be appreciated that in other variations of interlocking patterns, other interlocking methods may be applied.

Figure 6:
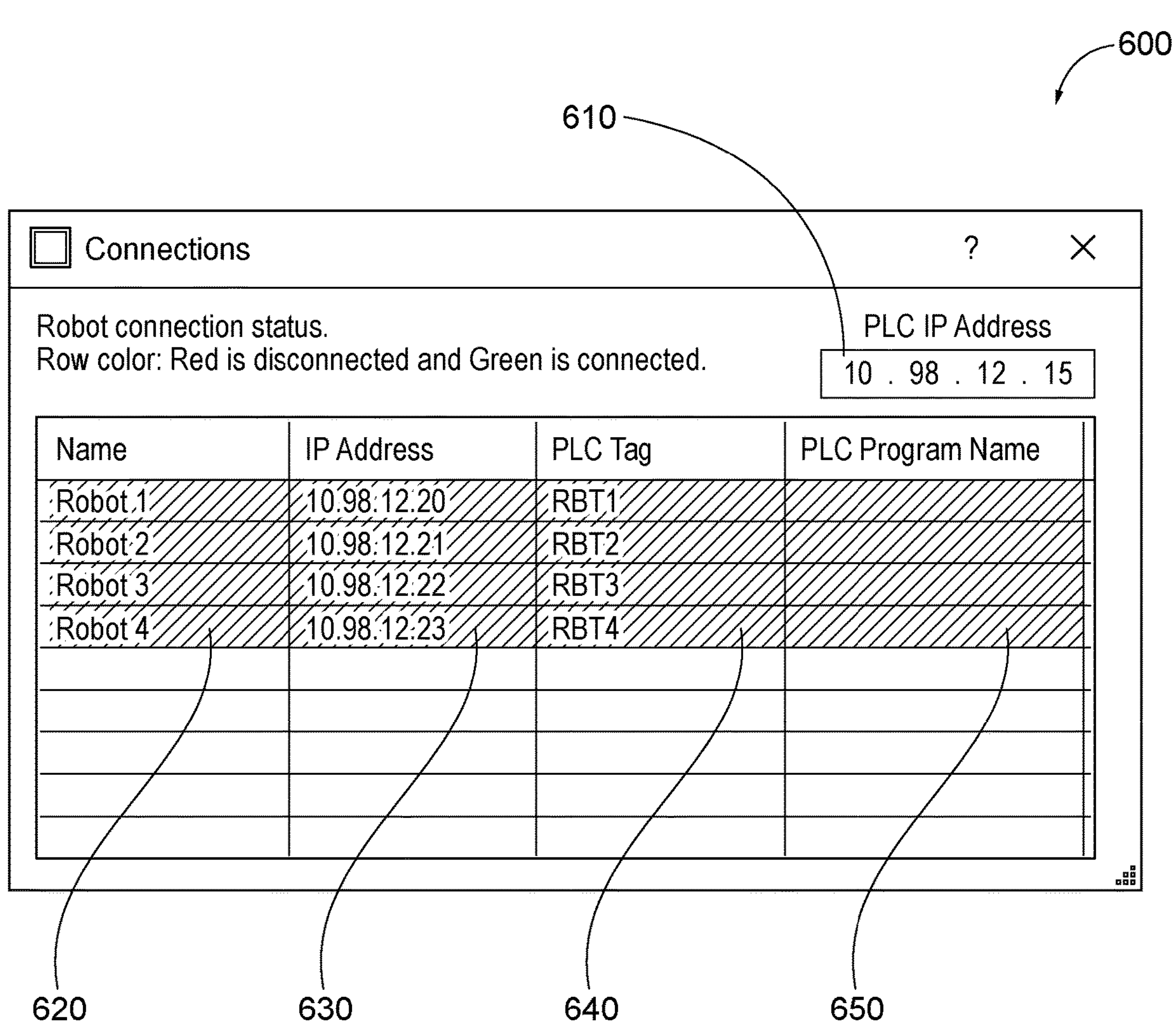
FIG. 6 is a screen rendering of a pop-up window displayed in the FIG. 1 system.

FIG. 6 illustrates an example of a pop-up window 600. Typically, the pop-up window 600 includes a controller IP address display 610, a component name 620, a component IP address 630, a controller tag 640, and a controller program name 650. As shown, the controller 120 is the PLC 142, and the components are the palletizers 140. The controller IP address display 610 shows the IP address of the PLC 142. The component name 620 lists the names of the palletizers 140 connected to the selected PLC 142. The component IP address 630 lists the IP addresses of each of the palletizers 140. The controller tag 640 lists the PLC 142 tag names assigned to each of the palletizers 140. The controller program name 650 lists the PLC 142 program names. Where the connection of the palletizer 140 to the controller 120 is lost, the pop-up window 600 will show a red color in the row indicating the information of the disconnected palletizer 140. In this way, the user can be visually notified of any communication failures between the controller 120 and the palletizers 140 for resolving the issue efficiently.

Figure 7:
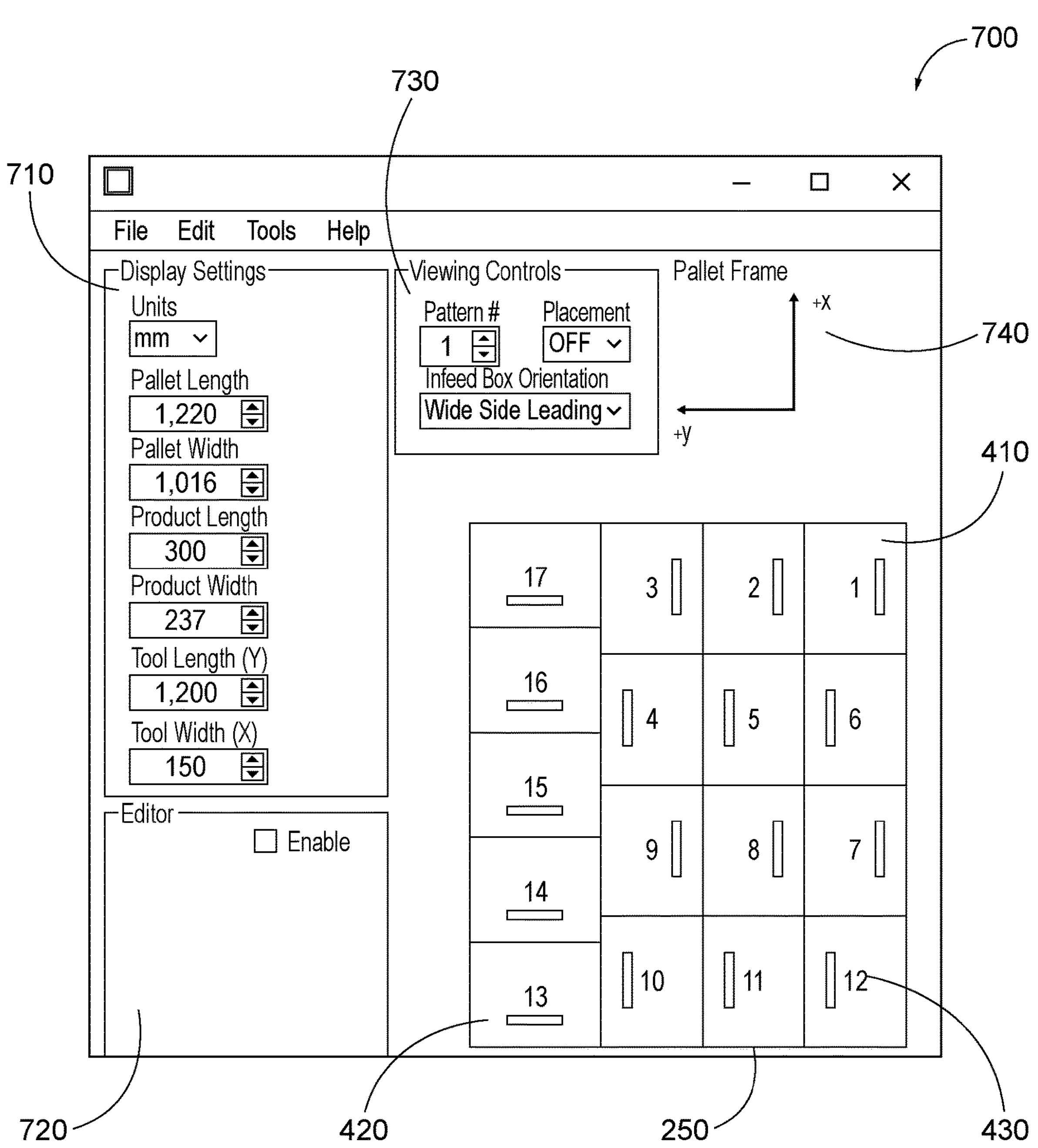
FIG. 7 is a screen rendering of a pattern editing interface displayed in the FIG. 1 system.

Now turning to FIG. 7, where an example of a pattern editing interface 700 is illustrated. The pattern editing interface 700 allows customers to visualize and edit the stacking pattern 145 that will be used by the palletizers 140. According to one example, the pattern editing interface 700 allows the user to perform the interference check of the stacking pattern 145. In another example, the pattern editing interface 700 allows the user to duplicate the stacking patterns 145. In a further example, the pattern editing interface 700 allows the user to perform automatic extrapolation of a placement. The pattern editing interface 700 includes, but not limited to, a pattern editing display area 710, an editor mode function selection 720, a viewing controls area 730, a pallet frame orientation 740, and the pattern image generation area 250. The pattern editing interface 700 complements the pattern management interface 200, where the user can implement and manage the stacking pattern 145 edited by the pattern editing interface 700 across the entire fleet of palletizers 140.

The pattern editing display area 710 includes one or more input boxes and/or dropdown lists for the user to enter necessary parameters, including but not limited to the length and width of the pallet 155 to be used, the length and width of the object 150 to be palletized, and the length and width of the palletizer 140 to be utilized. The user can also select and/or change the units of the parameters, including but not limited to, millimeters, inches, and centimeters.

The editor mode function selection 720 allows the user to select and/or unselect the editor mode. As should be recognized, by entering into the editor mode, the user can make edits to the stacking pattern 145. According to one example, the user can enter into the editor mode while the palletizer 140 is performing the palletizing task. In this way, the editing process will not affect the production environment.

The viewing controls area 730 includes one or more input boxes and/or dropdown lists for the user to adjust the view of the stacking pattern 145 to be shown on the pattern image generation area 250. As shown, the viewing controls area 730 includes an option for the user to enter and/or choose a specific pattern number to be shown in the pattern image generation area 250. The viewing controls area 730 further allows the user to choose the orientation of the infeed object 150. As shown, the user may choose the infeed object 150 to be wide side leading. In this case, the stacking pattern 145 shown on the pattern image generation area 250 will start arranging the vertical placement 410 from the lowest pattern numeral 430. As the size of the pallet 155 is fixed, some of the horizontal placements 420 will fill in any empty space that is left over by the vertical placement 410 based on the calculations of the system 100. The system 100 considers factors including but not limited to overhang, interlock, and/or interference of the objects 150. The viewing controls area 730 may further include an option for users to turn on and/or off the placement function. When the placement function is turned off, the system 100 does not send the palletizer 140 the stacking pattern 145 edited by the user on the pattern editing interface 700.

The pallet frame orientation 740 includes the indication of the orientation of the object 150 in the form of a coordinate system. In the 2D setting, the pallet frame orientation 740 includes an x-coordinate and a y-coordinate. In the 3D setting, the pallet frame orientation 740 includes an x-coordinate, a y-coordinate, and a z-coordinate. The pallet frame orientation 740 facilitates the baseline edge mark 440 to ensure the palletizer 140 palletizes the stacking pattern 145 in the correct direction on the identified pallet 155.

Figures 8, 9:
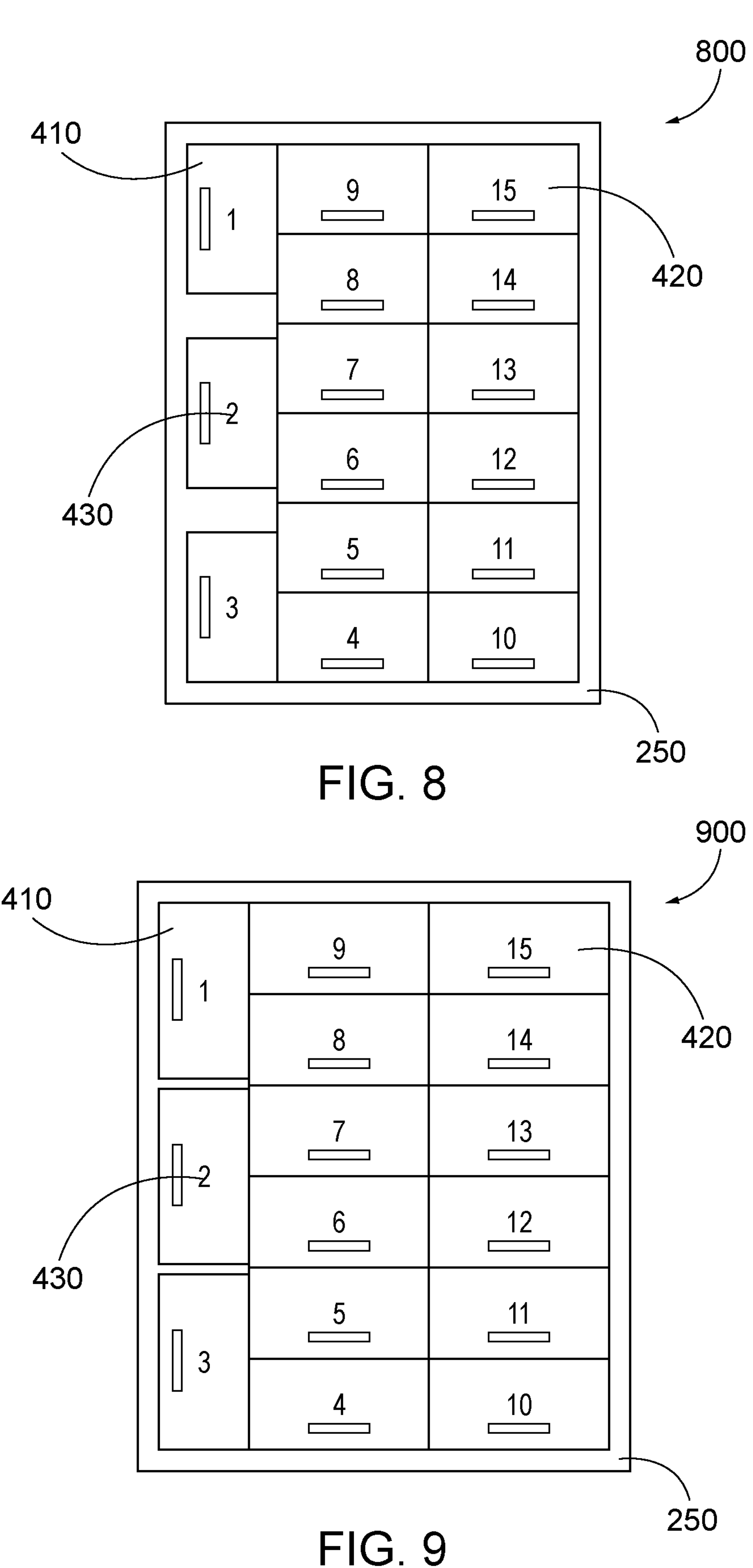
FIG. 8 is a top view of a small objects pattern example.
FIG. 9 is a top view of a large objects pattern example.

FIGS. 8 and 9 illustrate visualized examples of a small objects pattern example 800 and a large objects pattern example 900 that are based on the same stacking pattern 145. As aforementioned, the system 100 transforms the stacking pattern 145 into the non-dimensional data 153. As should be appreciated, the number of stacking patterns 145 required is significantly reduced due to the multiple uses of the same stacking pattern 145 for different palletizing tasks, which is made possible by using the non-dimensional data 153. The utilization of the non-dimensional data 153 reduces the development time for the stacking patterns 145. The utilization of the non-dimensional data 153 further compresses the space needed for storing the stacking patterns 145 in the database 110.

As shown in FIGS. 8 and 9, the small objects pattern example 800 illustrates fifteen of the objects 150 arranged in the certain stacking pattern 145 on the identified pallet 155. The large objects pattern example 900 illustrates another fifteen of the objects 150 arranged in the same stacking pattern 145 on the same pallet 155. However, each of the objects 150, represented by the vertical placements 410 and the horizontal placements 420, in the small objects pattern example 800 are in relatively smaller sizes than each of the objects 150, also represented by the vertical placements 410 and the horizontal placements 420, in the large objects pattern example 900. Despite the different sizes of the objects 150 in the small objects pattern example 800 and in the large objects pattern example 900, both of the small objects pattern example 800 and the large objects pattern example 900 utilize the same non-dimensional data 153. In other words, the user may use one of the non-dimensional data 153 in the library of the database 110 to load into two or more of the palletizers 140 provided that there is no interference or disallowed overhang of the objects 150 on the identified pallet 155. Each of the palletizers 140 will then palletize the objects 150 of different sizes without receiving the different stacking patterns 145 for each of the palletizers 140.

Figure 10:
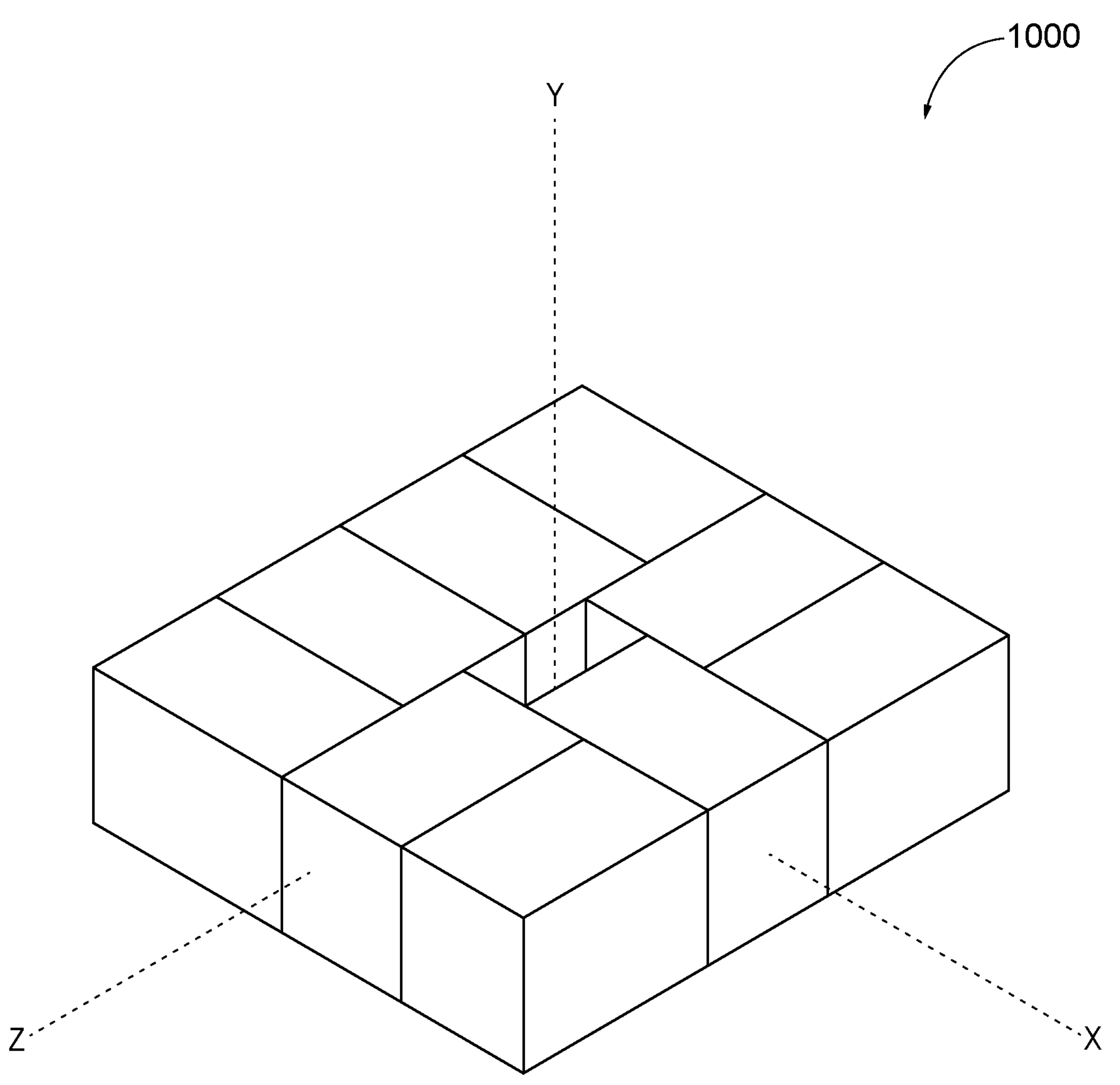
FIG. 10 is a screen rendering of a 3D pattern graphic displayed in the FIG. 1 system.

FIG. 10 illustrates an example of a 3D pattern graphic 1000. The 3D pattern graphic 1000 is the 3D visualizations of the stacking patterns 145 that shown on the pattern image generation area 250. The user may choose to generate the 3D pattern graphic 1000 on the pattern management interface 200 and/or on the pattern editing interface 700. The 3D pattern graphic 1000 provides a different visualization than the 2D graphic for the user in that the 3D pattern graphic 1000 presents layers of the stacking patterns 145. With the 3D pattern graphic 1000, the user may also visualize the interlocking of each layer of the stacking patterns 145.

Figure 11:
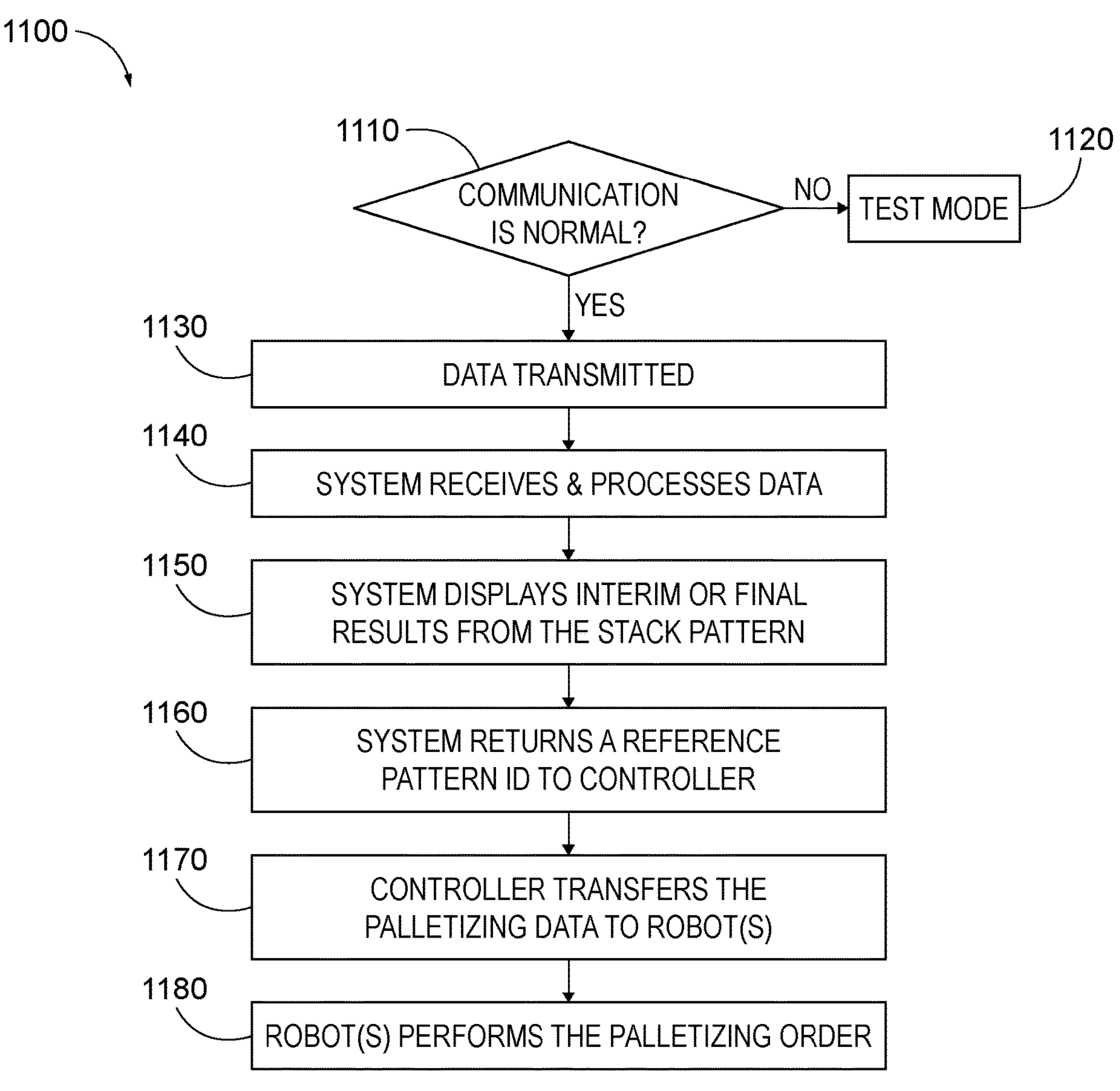
FIG. 11 is a flowchart of a process of robotic palletization using the FIG. 1 system.

A flowchart 1100 illustrating the process of robotic palletization using the system 100 is shown in FIG. 11. An example of the system 100 has been illustrated in FIG. 1. In stage 1110, the PLC 142 of the system 100 determines whether each component of the system 100 is able to communicate with the PLC 142 via the network 143. If there is no communication between the PLC 142 and any other component of the system 100, then the system 100 automatically switches to a test mode in stage 1120. As should be appreciated, the test mode is configured for the user to perform manual testing in which the stacking results can be shown. Once communications can be again made during the test mode in stage 1120, the application in the system 100 reestablishes the connection with the PLC 142 or other formerly disconnected components, and the system 100 continues to operate normally in stage 1110. If the communication is normal, necessary data is transmitted to the system 100 in stage 1130. The transmission can be performed manually by the user using the computer 141 or automatically by the PLC 142 retrieving the data from the database 110. In stage 1140, the system 100 receives the data and processes the data for selecting the stacking pattern 145. In stage 1150, the system 100 displays interim and/or final results of the stacking pattern 145 on the computer 141. Examples of the stacking pattern 145 can be found in FIG. 2 and/or in FIG. 7. Once the choice of the stacking pattern 145 is finalized, the system 100 returns a reference ID of the selected stacking pattern 145 back to the PLC 142 in stage 1160. In one particular example, the system 100 returns a reference pattern ID and error codes. The error codes can for example include an indication that the system 100 is unable to solve a particular stacking task, excessive overloads, communication errors, and the like. The system 100 sends the stacking pattern 145 to the robot arms 160 and a reference ID to the PLC 142. In one version, the system 100 only sends a reference ID to the PLC 142 which is passed on to the robot arms 160 in stage 1170. The PLC 142 only sends the reference ID to the robot arms 160 as the database 110 exists in the memory of the robot arms 160. In stage 1180, the robot arms 160 perform the palletization order on the identified pallet 155 in accordance with the stacking pattern 145. As should be recognized, the order of the stages can be in a different order than shown in the flowchart 1100 in FIG. 11 and/or some stages can occur at the same time. For example, stage 1160 in most cases typically occurs after stage 1170.

Figure 12:
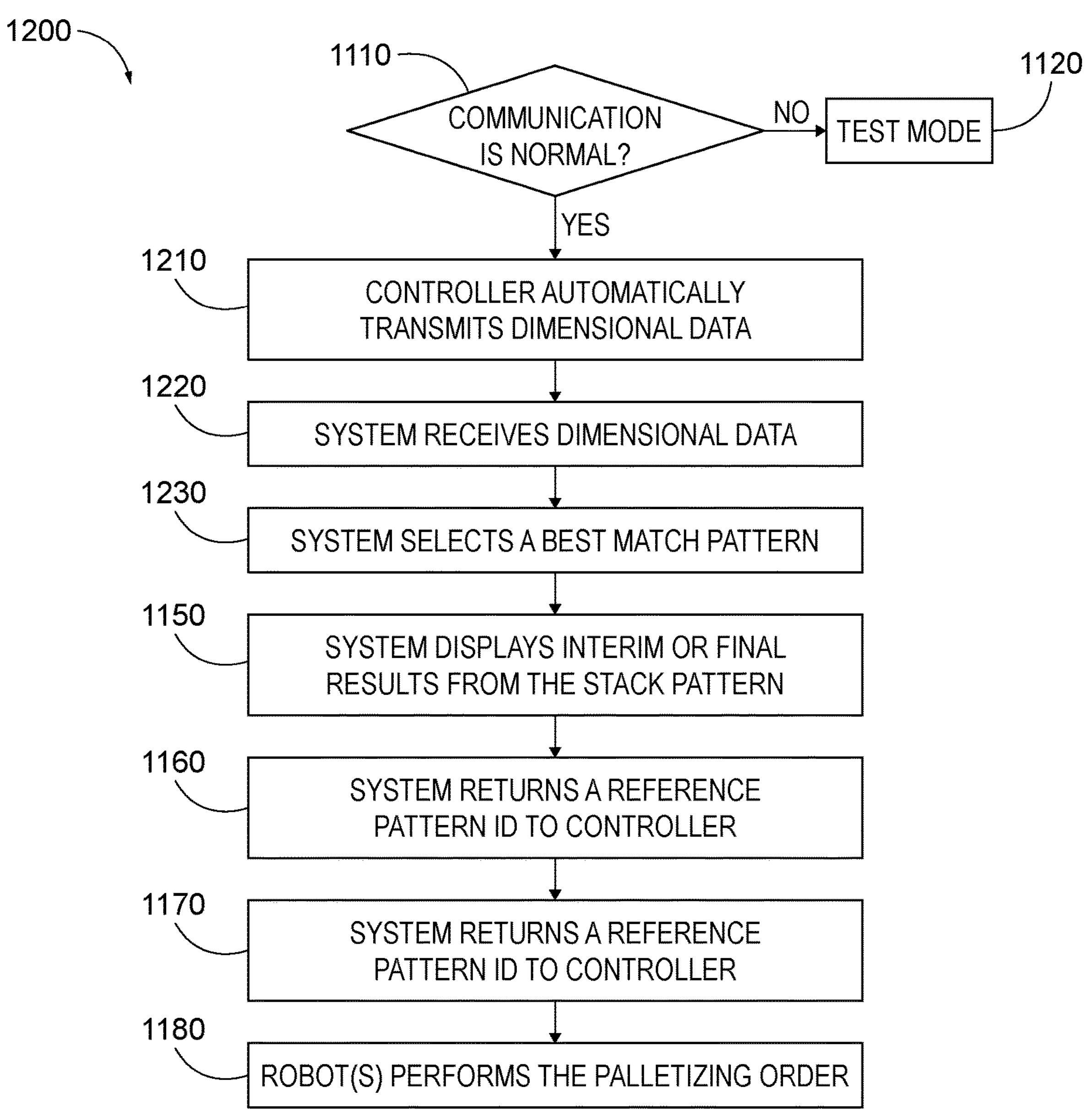
FIG. 12 is a flowchart of another process of robotic palletization using the FIG. 1 system.

A flowchart 1200 illustrating one approach of the process of robotic palletization using the system 100 is shown in FIG. 12. In stage 1110, the controller 120 determines whether the system 100 is unable to communicate with the controller 120. If there is no communication between the system 100 and the controller 120, then the system 100 automatically switches to a test mode in stage 1120. Once communications can be again made during the test mode in stage 1120, the application in the system 100 reestablishes the connection with the PLC 142 or other formerly disconnected components, and the system 100 continues to operate normally in stage 1110. If the communication is normal, in stage 1210 the controller 120 automatically transmits to the system 100 the necessary dimensional data of the objects 150 and/or of the pallets 155 retrieved from the database 110. The system 100 receives the necessary dimensional data sent by the controller 120 in stage 1220. In response, the system 100 selects the stacking pattern 145 from the database 110 to match the dimensional requirements in stage 1230. During the stacking pattern 145 selection process, the system 100 considers several factors including, but not limited to, case collision avoidance, excessive overhang, and/or maximizing the number of the objects 150 on the identified pallet 155. As should be appreciated, the system 100 may select one or more best matched stacking patterns 145. In stage 1150, the system 100 displays interim and/or final results of the stacking pattern 145 on the interface 130. As aforementioned, examples of the stacking pattern 145 can be found in FIG. 2 and/or FIG. 7. Thereafter, the system 100 returns a reference ID of the stacking pattern 145 back to the controller 120 in stage 1160. In one particular example, the system 100 returns a reference pattern ID and error codes. The error codes can for example include an indication that the system 100 is unable to solve a particular stacking task, excessive overloads, communication errors, and the like. The system 100 sends the stacking pattern 145 to the robot arms 160 and a reference ID to the controller 120. In one version, the system 100 only sends a reference ID to the controller 120 which is passed on to the robot arms 160 in stage 1170. The controller 120 only sends the reference ID to the robot arms 160 as the database 110 exists in the memory of the robot arms 160. In stage 1180, the palletizers 140 perform the palletization order on the identified pallet 155 in accordance with the stacking pattern 145. As should be recognized, the order of the stages can be in a different order than shown in the flowchart 1200 in FIG. 12 and/or some stages can occur at the same time. For example, stage 1160 in most cases typically occurs after stage 1170.

Figure 13:
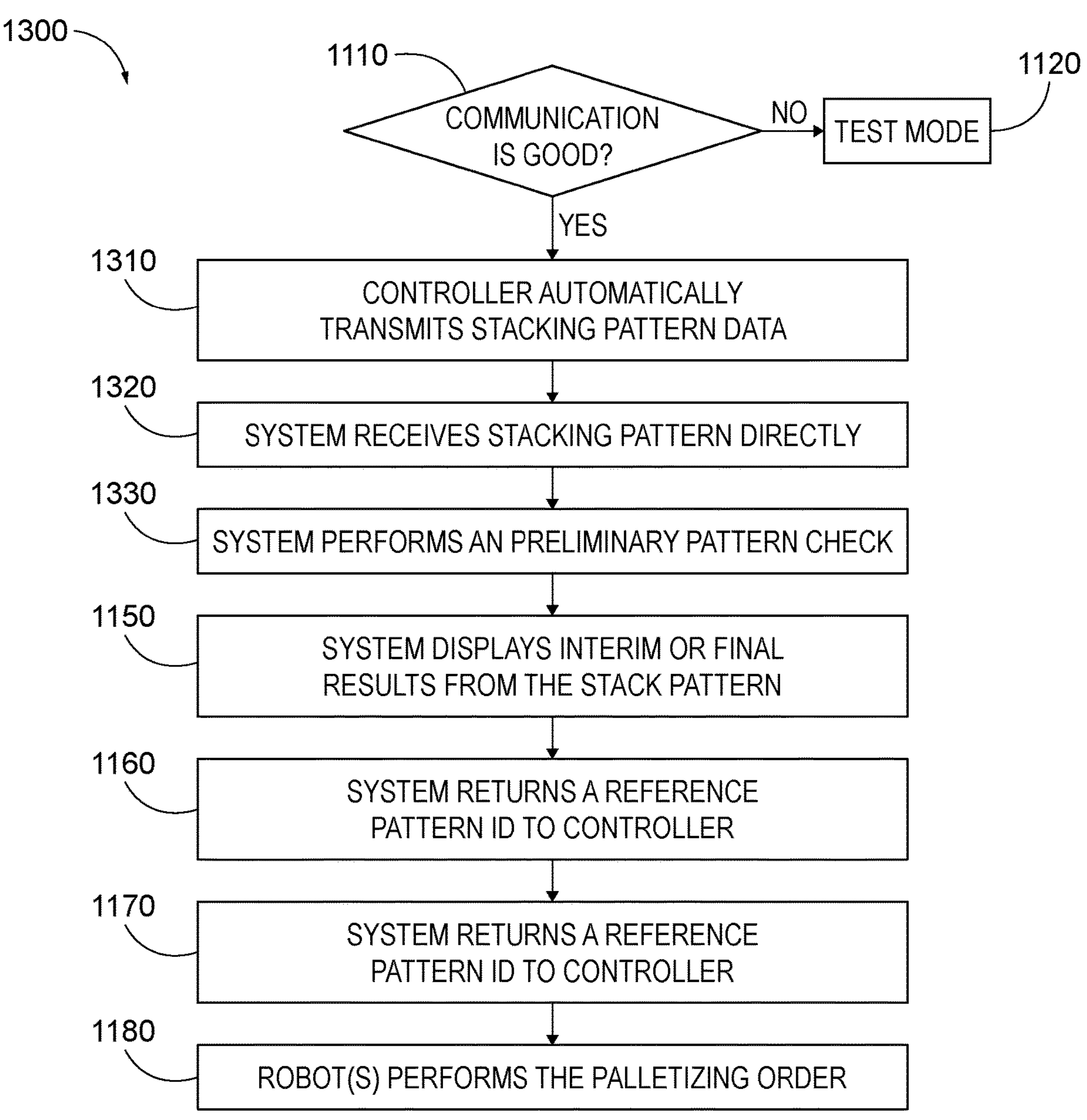
FIG. 13 is a flowchart of still yet another process of robotic palletization using the FIG. 1 system.

A flowchart 1300 illustrating another approach of the process of robotic palletization using the system 100 is shown in FIG. 13. In stage 1110, the controller 120 determines whether the system 100 is unable to communicate with the controller 120. If there is no communication between the system 100 and the controller 120, then the system 100 automatically switches to a test mode in stage 1120. Once communications can be again made during the test mode in stage 1120, the application in the system 100 reestablishes the connection with the PLC 142 or other formerly disconnected components, and the system 100 continues to operate normally in stage 1110. If the communication is normal, in stage 1310 the controller 120 directly transmits the selected stacking pattern 145 for the identified object 150 and the identified pallet 155 to the system 100. In this situation, the system 100 directly receives the selected stacking pattern 145 in stage 1320. Rather than making a selection of the best matching stacking pattern 145, the system 100 performs a preliminary check in stage 1330. The preliminary check includes but is not limited to overhang and/or interference. In stage 1150, the system 100 displays interim and/or final results of the stacking pattern 145 on the interface 130. As aforementioned, examples of the stacking pattern 145 can be found in FIG. 2 and/or FIG. 7. Thereafter, the system 100 returns a reference ID of the stacking pattern 145 back to the controller 120 in stage 1160. In one particular example, the system 100 returns a reference pattern ID and error codes. The error codes can for example include an indication that the system 100 is unable to solve a particular stacking task, excessive overloads, communication errors, and the like. The system 100 sends the stacking pattern 145 to the robot arms 160 and a reference ID to the controller 120. In one version, the system 100 only sends a reference ID to the controller 120 which is passed on to the robot arms 160 in stage 1170. The controller 120 only sends the reference ID to the robot arms 160 as the database 110 exists in the memory of the robot arms 160. In stage 1180, the palletizers 140 perform the palletization order on the identified pallet 155 in accordance with the stacking pattern 145. As should be recognized, the order of the stages can be in a different order than shown in the flowchart 1300 in FIG. 13 and/or some stages can occur at the same time. For example, stage 1160 in most cases typically occurs after stage 1170.

Figure 14:
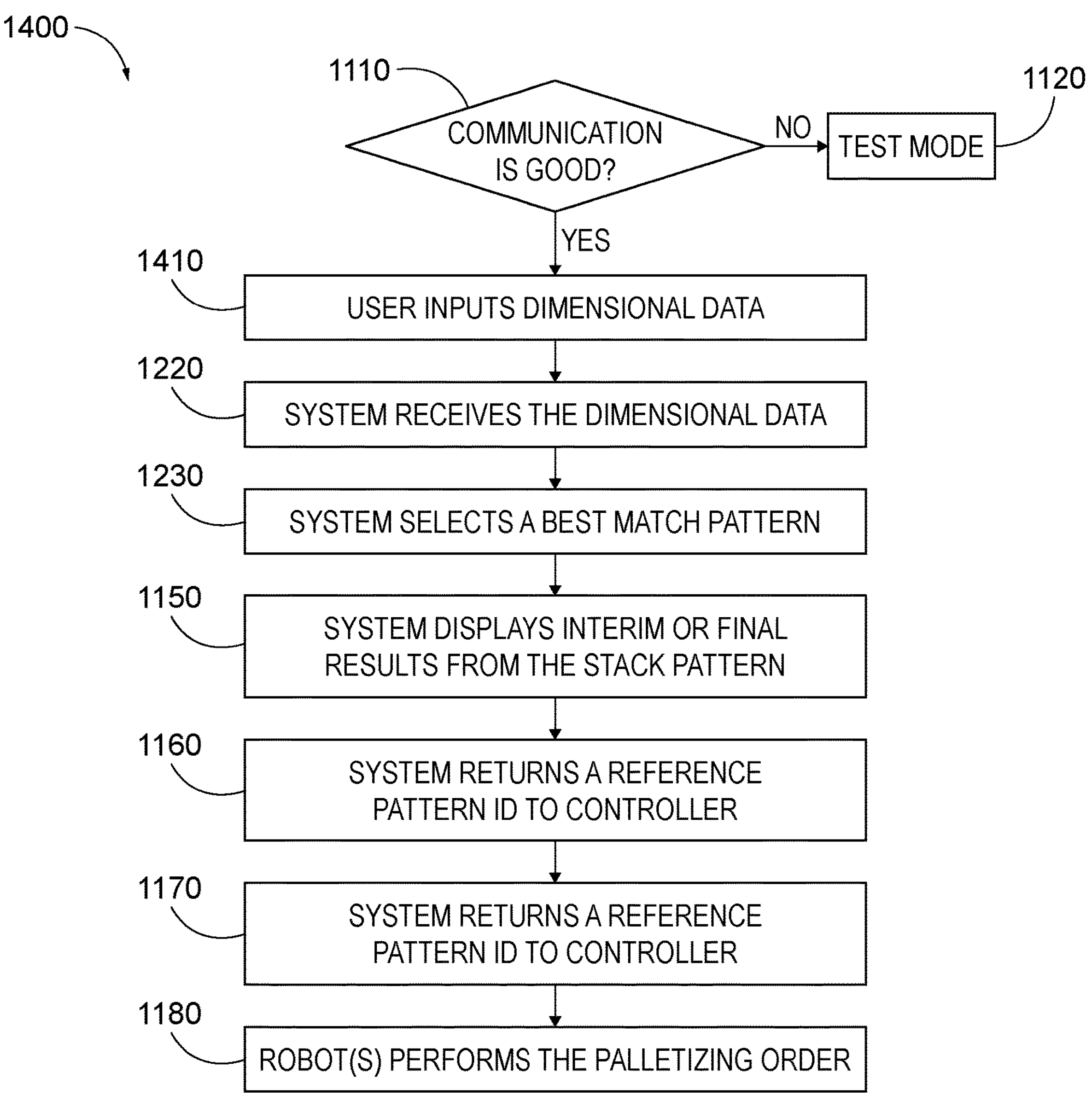
FIG. 14 is a flowchart of a further approach of robotic palletization using the FIG. 1 system.

A flowchart 1400 illustrating a further approach of the process of robotic palletization using the system 100 is shown in FIG. 14. In stage 1110, the controller 120 determines whether the system 100 is unable to communicate with the controller 120. If there is no communication between the system 100 and the controller 120, then the system 100 automatically switches to a test mode in stage 1120. Once communications can be again made during the test mode in stage 1120, the application in the system 100 reestablishes the connection with the PLC 142 or other formerly disconnected components, and the system 100 continues to operate normally in stage 1110. If the communication is normal, in stage 1410 the user may input the necessary dimensional data of the objects 150 and/or the pallets 155. The system 100 receives the necessary dimensional data sent by the controller 120 in stage 1220. In response, the system 100 selects the stacking pattern 145 from the database 110 to match the dimensional requirements in stage 1230. During the stacking pattern 145 selection process, the system 100 considers several factors including, but not limited to, case collision avoidance, excessive overhang, and/or maximizing the number of the objects 150 on the identified pallet 155. As should be appreciated, the system 100 may select one or more best matched stacking patterns 145. In stage 1150, the system

100 displays interim and/or final results of the stacking pattern 145 on the interface 130. As aforementioned, examples of the stacking pattern 145 can be found in FIG. 2 and/or FIG. 7. Thereafter, the system 100 returns a reference ID of the stacking pattern 145 back to the controller 120 in stage 1160. In one particular example, the system 100 returns a reference pattern ID and error codes. The error codes can for example include an indication that the system 100 is unable to solve a particular stacking task, excessive overloads, communication errors, and the like. The system 100 sends the stacking pattern 145 to the robot arms 160 and a reference ID to the controller 120. In one version, the system 100 only sends a reference ID to the controller 120 which is passed on to the robot arms 160 in stage 1170. The controller 120 only sends the reference ID to the robot arms 160 as the database 110 exists in the memory of the robot arms 160. In stage 1180, the palletizers 140 perform the palletization order on the identified pallet 155 in accordance with the stacking pattern 145. As should be recognized, the order of the stages can be in a different order than shown in the flowchart 1400 in FIG. 14 and/or some stages can occur at the same time. For example, stage 1160 in most cases typically occurs after stage 1170.

Figure 15:
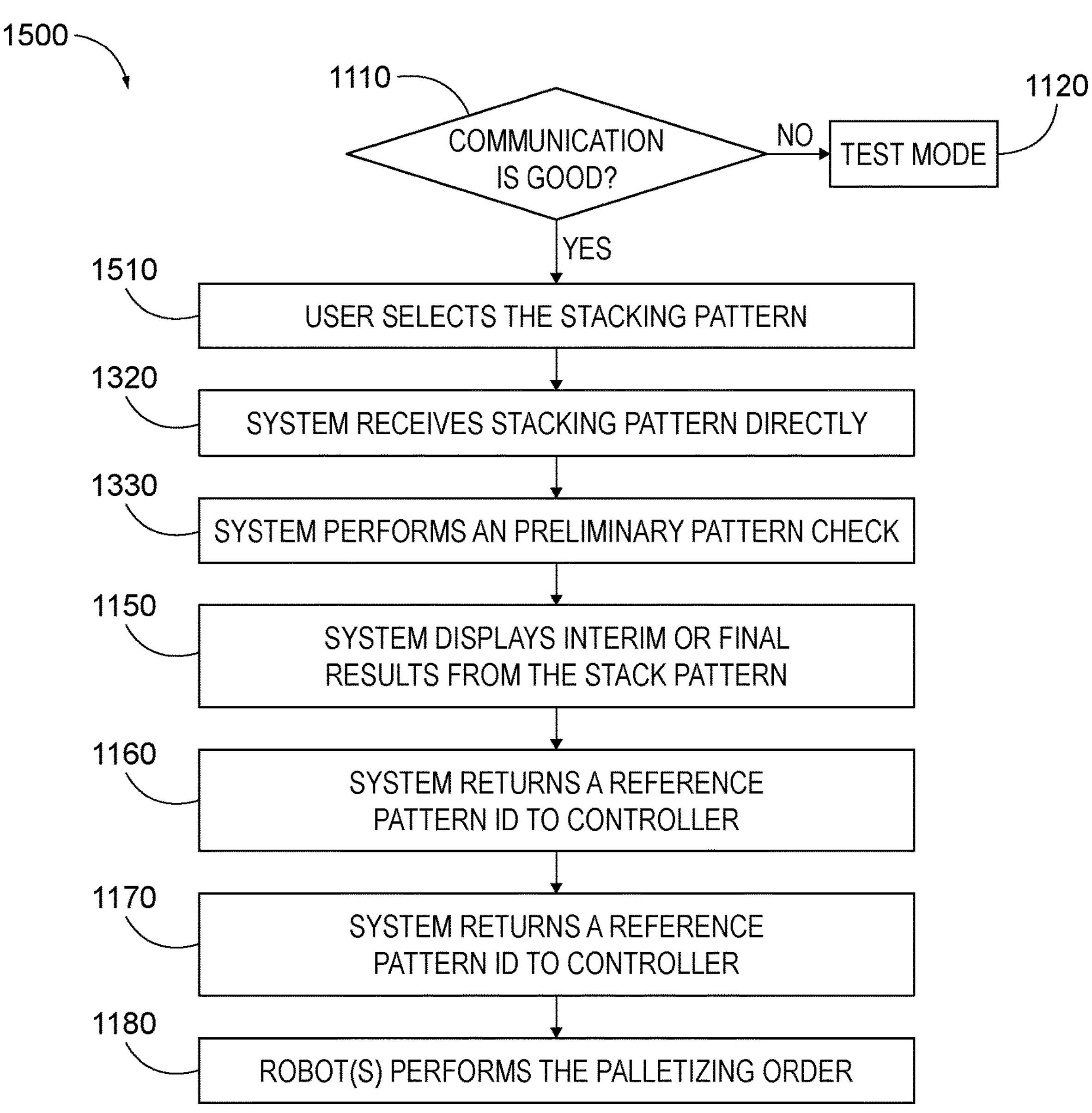
FIG. 15 is a flowchart of another approach of robotic palletization using the FIG. 1 system.

A flowchart 1500 illustrating another approach of the process of robotic palletization using the system 100 is shown in FIG. 15. In stage 1110, the controller 120 determines whether the system 100 is unable to communicate with the controller 120. If there is no communication between the system 100 and the controller 120, then the system 100 automatically switches to a test mode in stage 1120. Once communications can be again made during the test mode in stage 1120, the application in the system 100 reestablishes the connection with the PLC 142 or other formerly disconnected components, and the system 100 continues to operate normally in stage 1110. If the communication is normal, in stage 1510 the user may directly select the stacking pattern 145 for the identified object 150 and the identified pallet 155. In this situation, the system 100 directly receives the selected stacking pattern 145 in stage 1320. Rather than making a selection of the best matching stacking pattern 145, the system 100 performs a preliminary check in stage 1330. The preliminary check includes but is not limited to overhang and/or interference. In stage 1150, the system 100 displays interim and/or final results of the stacking pattern 145 on the interface 130. As aforementioned, examples of the stacking pattern 145 can be found in FIG. 2 and/or FIG. 7. Thereafter, the system 100 returns a reference ID of the stacking pattern 145 back to the controller 120 in stage 1160. In one particular example, the system 100 returns a reference pattern ID and error codes. The error codes can for example include an indication that the system 100 is unable to solve a particular stacking task, excessive overloads, communication errors, and the like. The system 100 sends the stacking pattern 145 to the robot arms 160 and a reference ID to the controller 120. In one version, the system 100 only sends a reference ID to the controller 120 which is passed on to the robot arms 160 in stage 1170. The controller 120 only sends the reference ID to the robot arms 160 as the database 110 exists in the memory of the robot arms 160. In stage 1180, the palletizers 140 perform the palletization order on the identified pallet 155 in accordance with the stacking pattern 145. As should be recognized, the order of the stages can be in a different order than shown in the flowchart 1500 in FIG. 15 and/or some stages can occur at the same time. For example, stage 1160 in most cases typically occurs after stage 1170.

Figure 16:
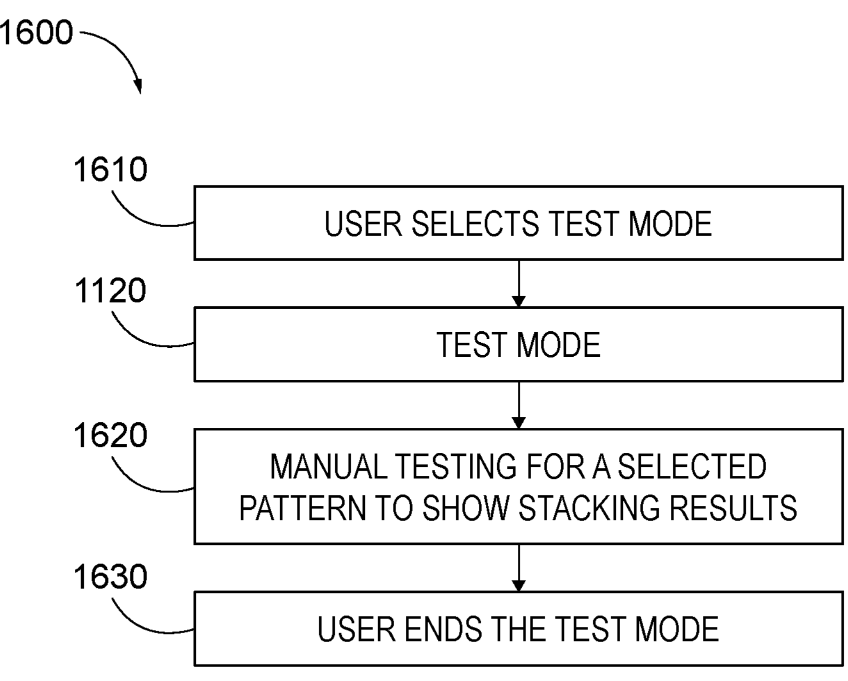
FIG. 16 is a flowchart of a technique for entering a test mode in the FIG. 1 system.

A flowchart 1600 illustrating a further example of entering the test mode is shown in FIG. 16. As should be appreciated, the test mode is configured to perform manual testing in which the stacking results can be shown. As aforementioned, if there is no communication between the system 100 and the controller 120, then the system 100 automatically switches to a test mode; and if the communication between the system 100 and the controller 120 is restored, the system 100 will automatically exit the test mode. However, as illustrated in the flowchart 1600, the user may also select to enter the test mode manually in stage 1610. Once the user selected the test mode, the system 100 enters the test mode in stage 1120. While in the test mode, in stage 1620, the user may perform manual testing for the selected stacking pattern 145 by inputting values on the interface 130 for testing purposes. Typically, but not always, the system 100 does not send the stacking pattern 145 to the palletizer 140 during the test mode. Finally, in stage 1630, the user may end the test mode. In another version, the test mode is separate from the whole process of receiving patterns, so the test mode does not conflict with production.

Figure 17:
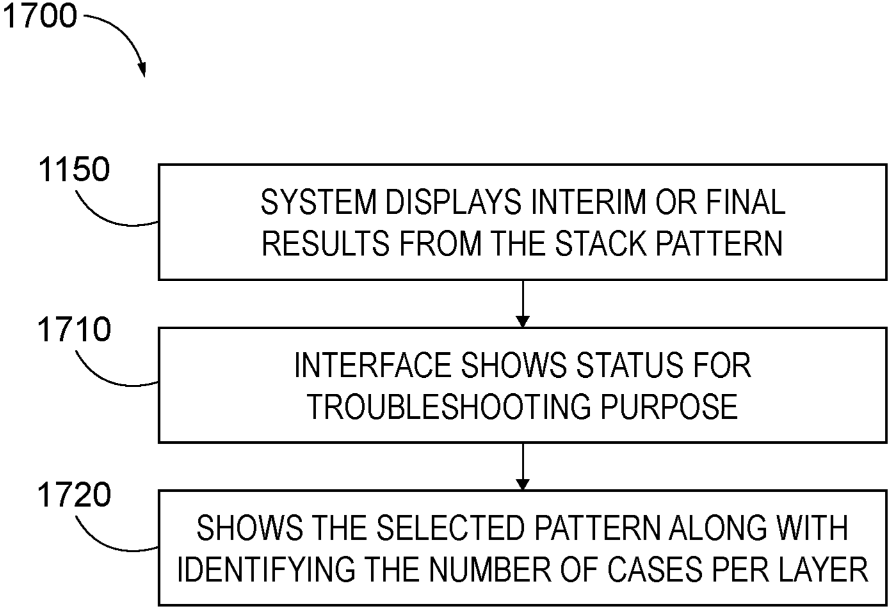
FIG. 17 is a flowchart of a technique for displaying interim or final results in the FIG. 1 system.

FIG. 17 shows a flowchart 1700 illustrating a detailed example of stage 1150, where the system 100 displays interim and/or final results from the stacking pattern 145. As aforementioned, examples of the stacking pattern 145 can be found in FIG. 2 and/or FIG. 7. In stage 1710, the system 100 shows the status of the system 100, including the components of the system 100, on the interface 130 for troubleshooting purposes. In stage 1720, the system 100 generates a graphic on the interface 130 to show the selected stacking pattern 145 along with the number of the objects 150 per layer. In other variations, the system 100 provides the history from one or more PLCs 142 and robot arms 160 on the interface 130.

Figure 18:
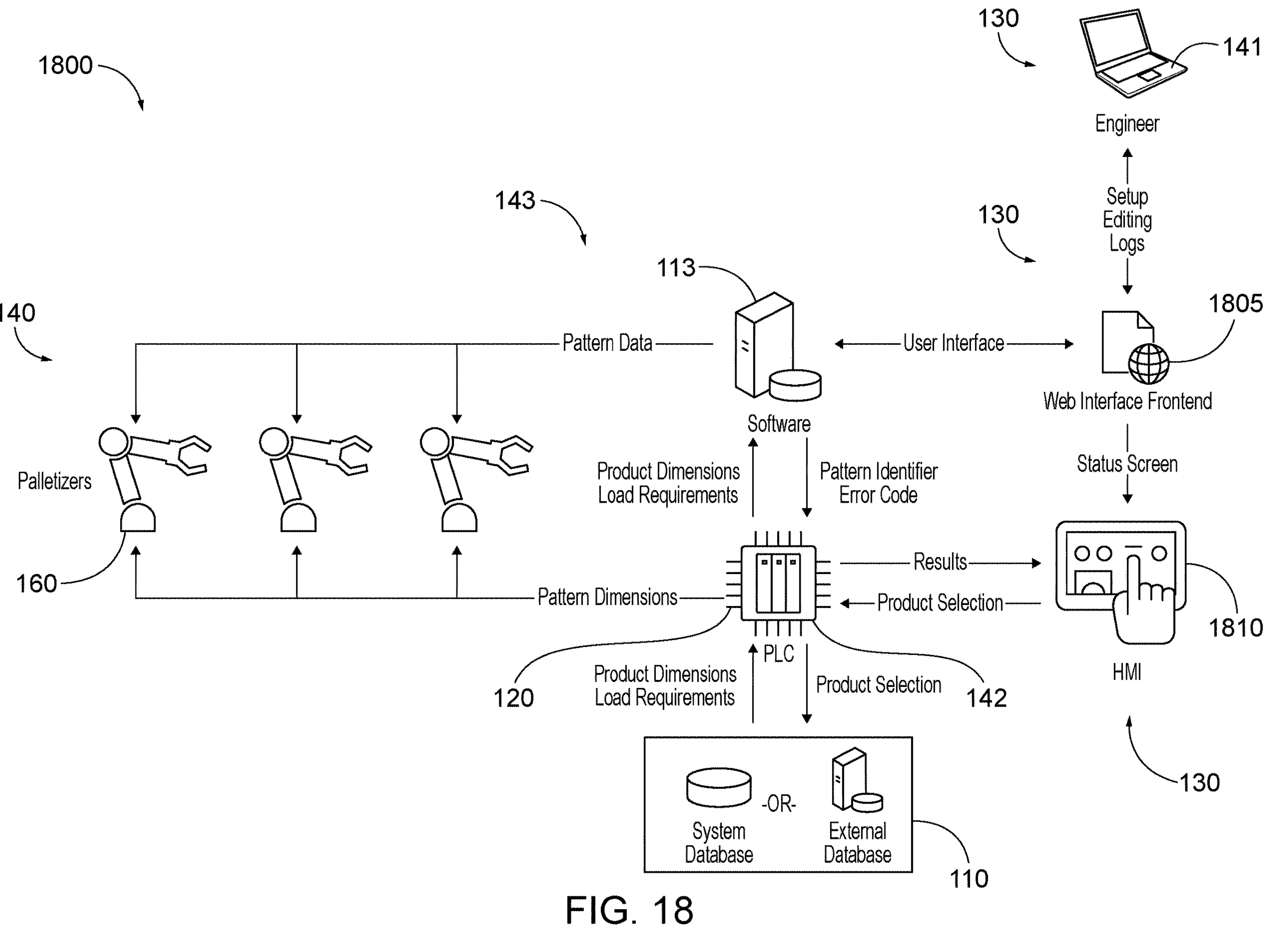
FIG. 18 is a diagram of a system according to another example.

A system 1800 according to another example is illustrated in FIG. 18. As should be recognized, all lines in FIG. 18 represent network communications. The system 1800 in FIG. 18 operates in a fashion similar to the system 100 in FIG. 1. For instance, the system 1800 operates in a similar fashion to what was described previously with respect to FIGS. 11 to 17. As should be also recognized, the system 1800 in FIG. 18 shares a number of components in common with the system 100 in FIG. 1. For example, the system 1800 in FIG. 18 includes the database 110, controller 120, interface 130, and palletizer 140 of the type described before. The database 110 can include a local database and/or a warehouse management system (WMS) database hosted on a remote server. In one version, the database 110 is a system database that lives in the PLC 142. In another version, the database 110 is accessed using a warehouse management software that holds the database 110. According to one embodiment, the warehouse management software is contained in the memory of the server 113. The server 113 in FIG. 18 is separated from the database 110. The server 113 includes applications and other software for interfacing with the database 110, controllers 120, users via the interfaces 130, and palletizers 140. Like before, the interface 130 includes the computer 141 as one example, and the controller 120 is in the form of the PLC 142. The database 110, server 113, controllers 120, interfaces 130, and palletizers 140 are configured to communicate with one another via the network 143. Once more, the palletizers 140 are in the form of robot arms 160 but other types of palletizers can be used. For the sake of brevity as well as clarity, these common operations, functions, and components will not be again described in detail, but please refer to the previous discussion of these features.

Once more, the network 143 is used to communicate information between the various components of the system 1800. In the illustrated example, the interface 130 includes a web interface 1805 and a human machine interface (HMI) 1810. The information used by the web interface 1805 is provided by the server 113 via the network 143. The web interface 1805 can be for example accessed via a browser on the computer 141. Engineers and others using the web interface 1805 on the computer 141 are able to perform setup operations, edit various stacking parameters, and access logs, to name just a few examples. In one version, the HMI 1810 is communicating with the PLC 142 via the network 143. In another version, the HMI 1810 is mounted on or proximal to the PLC 142. Via the HMI 1810, an individual is able to view the results over various operations and check the status of various parts of the system 1800. The HMI 1810 further allows the user to make product selections and/or changes to palletizing operations. The product selection can be logged into the database 110. the database 110 is configured to communicate product dimensions and load requirements to the PLC 142, and the product dimensions are in turn communicated to the appropriate palletizers 140. Information about the product dimensions and load requirements is also shared between the server 113 and PLC 142. Pattern identifiers (ID's) and error codes are also communicated between the server 113 and the PLC 142. The server 113 further provides pattern data to the palletizers 140. Some example web pages provided via the web interface 1805 of the system 1800 will be described with reference to the subsequent drawings. It should be recognized that the system 1800 can generate other web pages and/or provide outputs in different forms. For example, the system 1800 can provide audible and/or tactile information.

Figure 19:
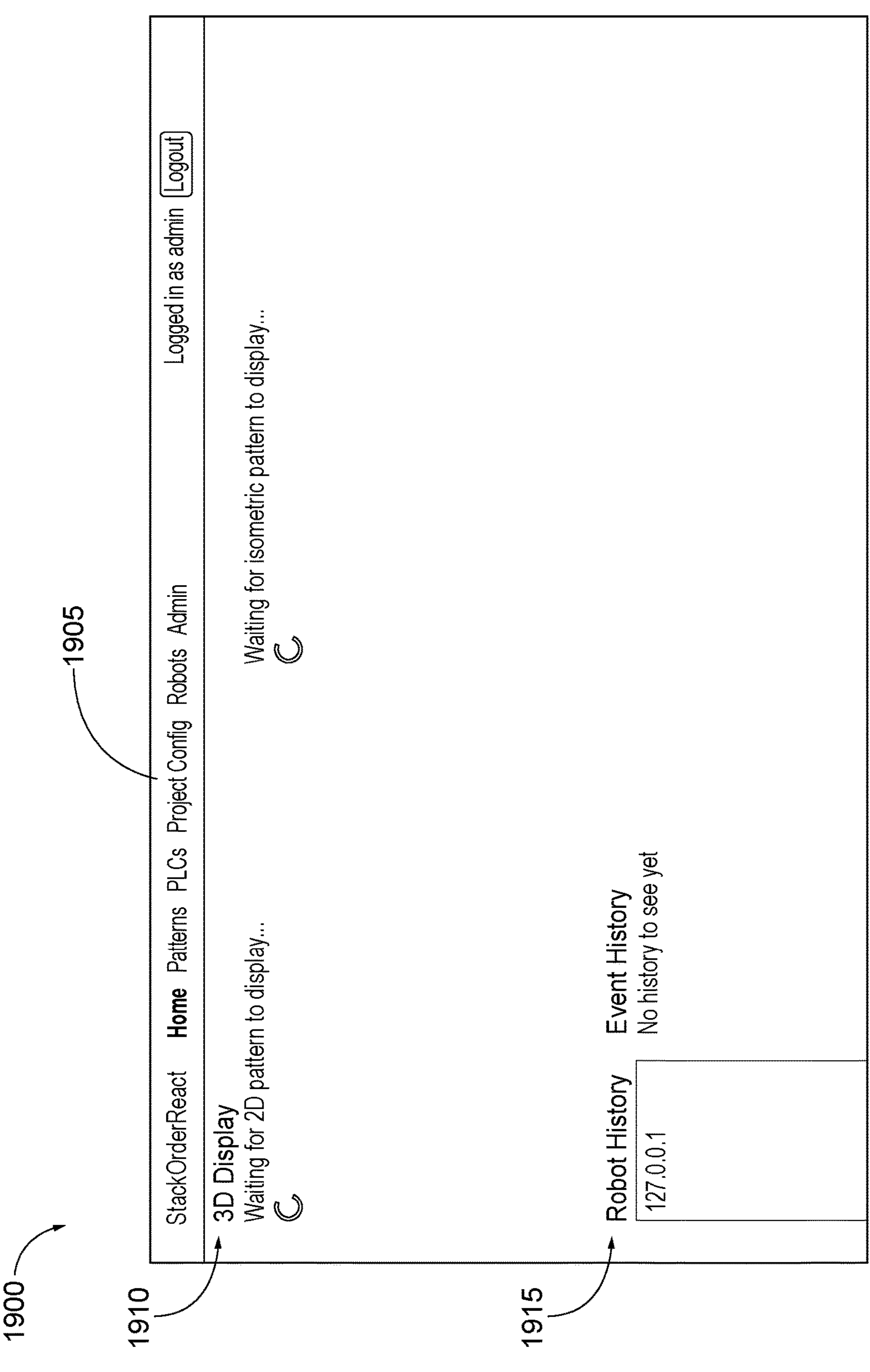
FIG. 19 is a screen rendering of a dashboard page displayed in the FIG. 18 system.

FIG. 19 shows an example of a dashboard page 1900 that can be provided via the web interface 1805 of the system 1800 of FIG. 18. The dashboard page 1900 provides the status and history of various activities and components of the system 1800. To facilitate navigation between the various pages, the dashboard page 1900 has a menu bar 1905. As shown, the dashboard page 1900 includes a pattern display area 1910 where various current stacking patterns or other visual types of information is displayed. The dashboard page 1900 further includes a history display area 1915 that provides history or log information concerning the robot arms 160 and events. It should be recognized that the dashboard page 1900 can provide other types of status information.

Figure 20:
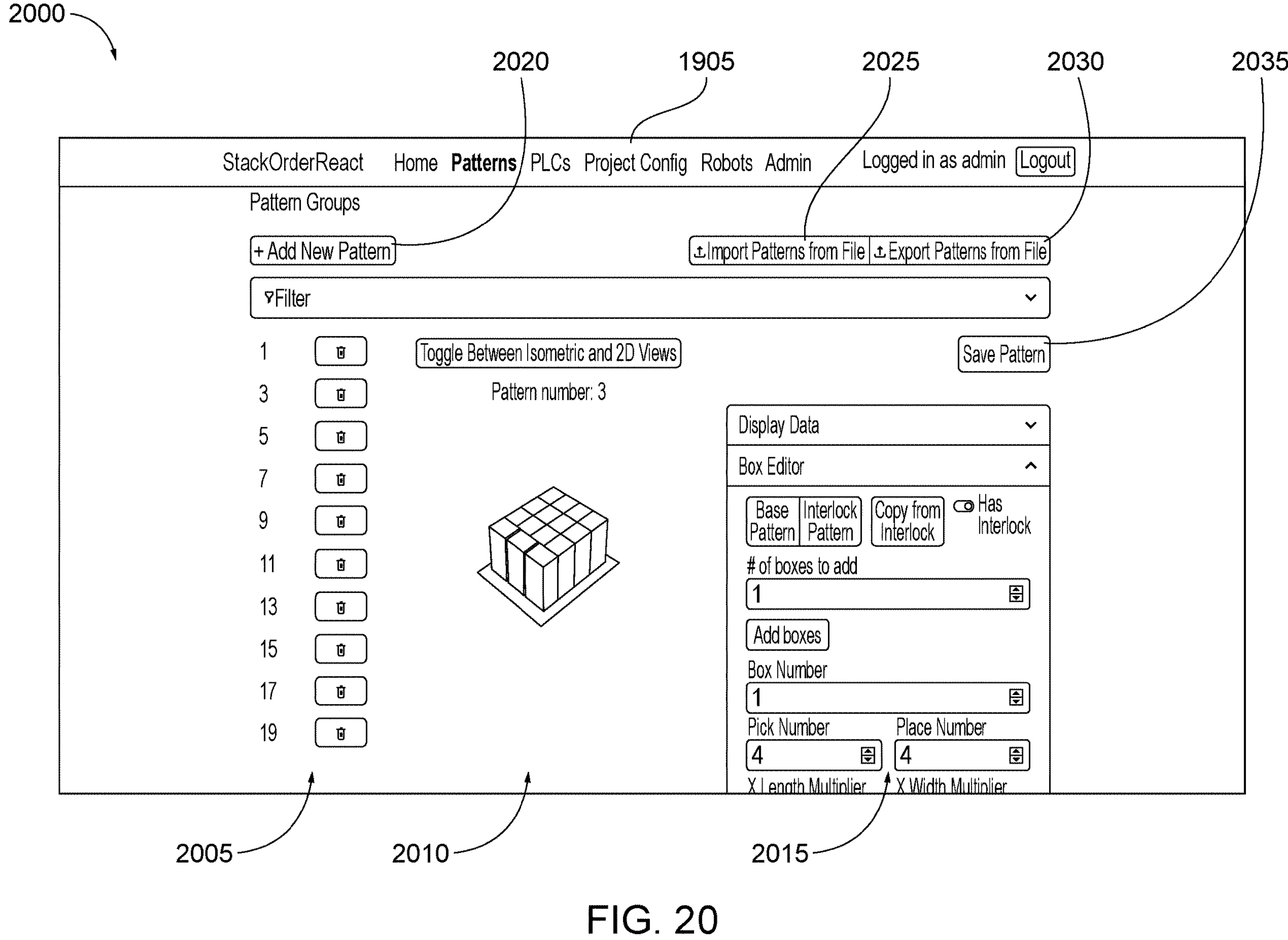
FIG. 20 is a screen rendering of a pattern editor page displayed in the FIG. 18 system.

An example of a pattern editor page 2000 that is provided via the web interface 1805 is shown in FIG. 20. With the pattern editor page 2000, a user can edit stacking patterns and update other information. Like before, the pattern editor page 2000 includes the menu bar 1905 to facilitate navigation. As can be seen, the pattern editor page 2000 includes a pattern editor bar 2005, a pattern display area 2010, and a pattern edit area 2015. The various stacking patterns can be selected for editing and deletion (e.g., via a button) in the pattern editor bar 2005. The stacking patterns can be viewed in the pattern display area 2010, and specific information concerning the stacking patterns can be edited in the pattern edit area 2015. A new stacking pattern can be added by clicking an add new pattern button 2020 in the pattern editor page 2000. The pattern editor page 2000 in FIG. 20 further includes an import patterns button 2025 and an export patterns button 2030 that facilitate importing stacking patterns from files and exporting stacking patterns to files, respectively. Any edits to the stacking pattern can be saved by clicking a save pattern button 2035 in the pattern editor page 2000.

Figure 21:
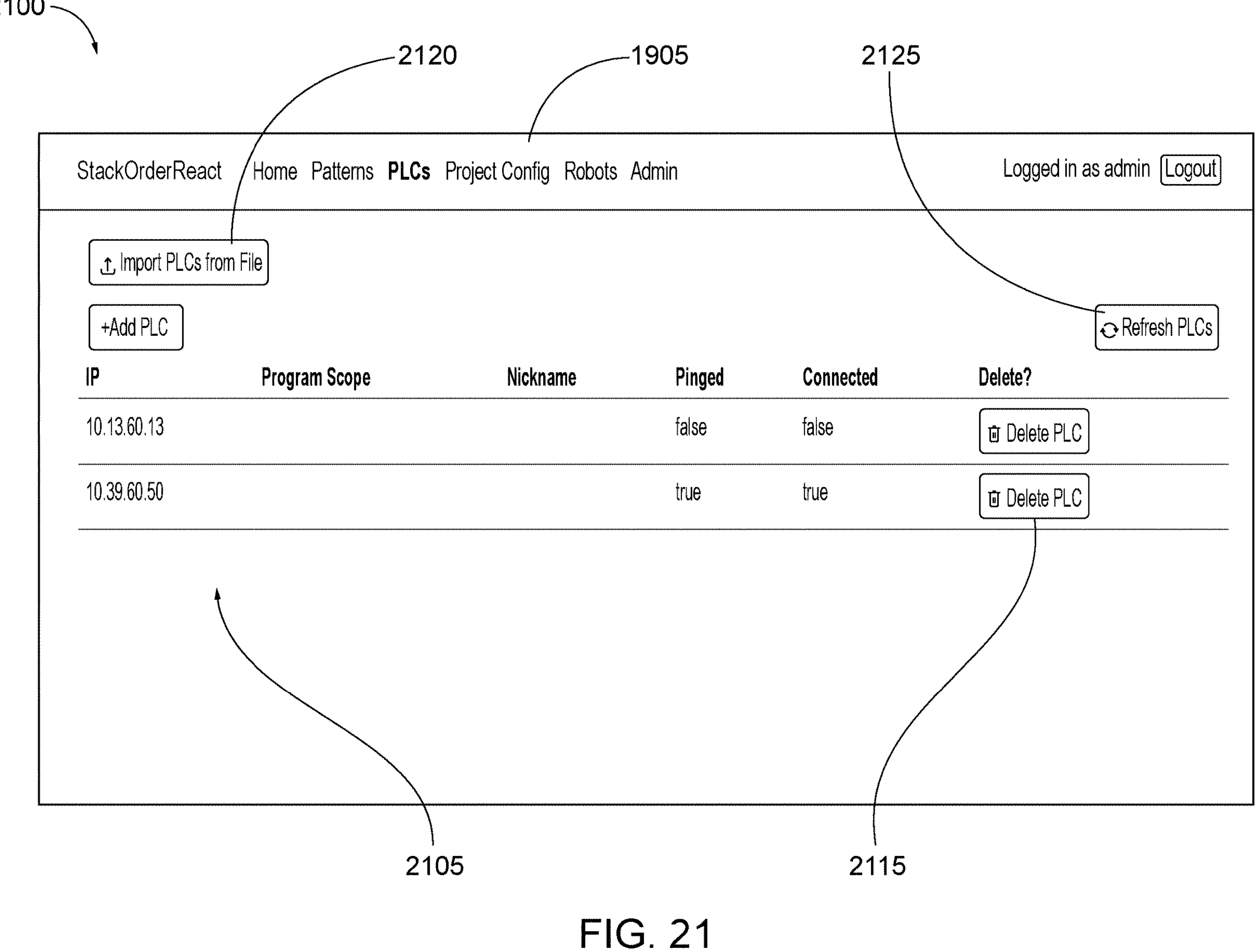
FIG. 21 is a screen rendering of a PLC configuration page displayed in the FIG. 18 system.
Figure 22:
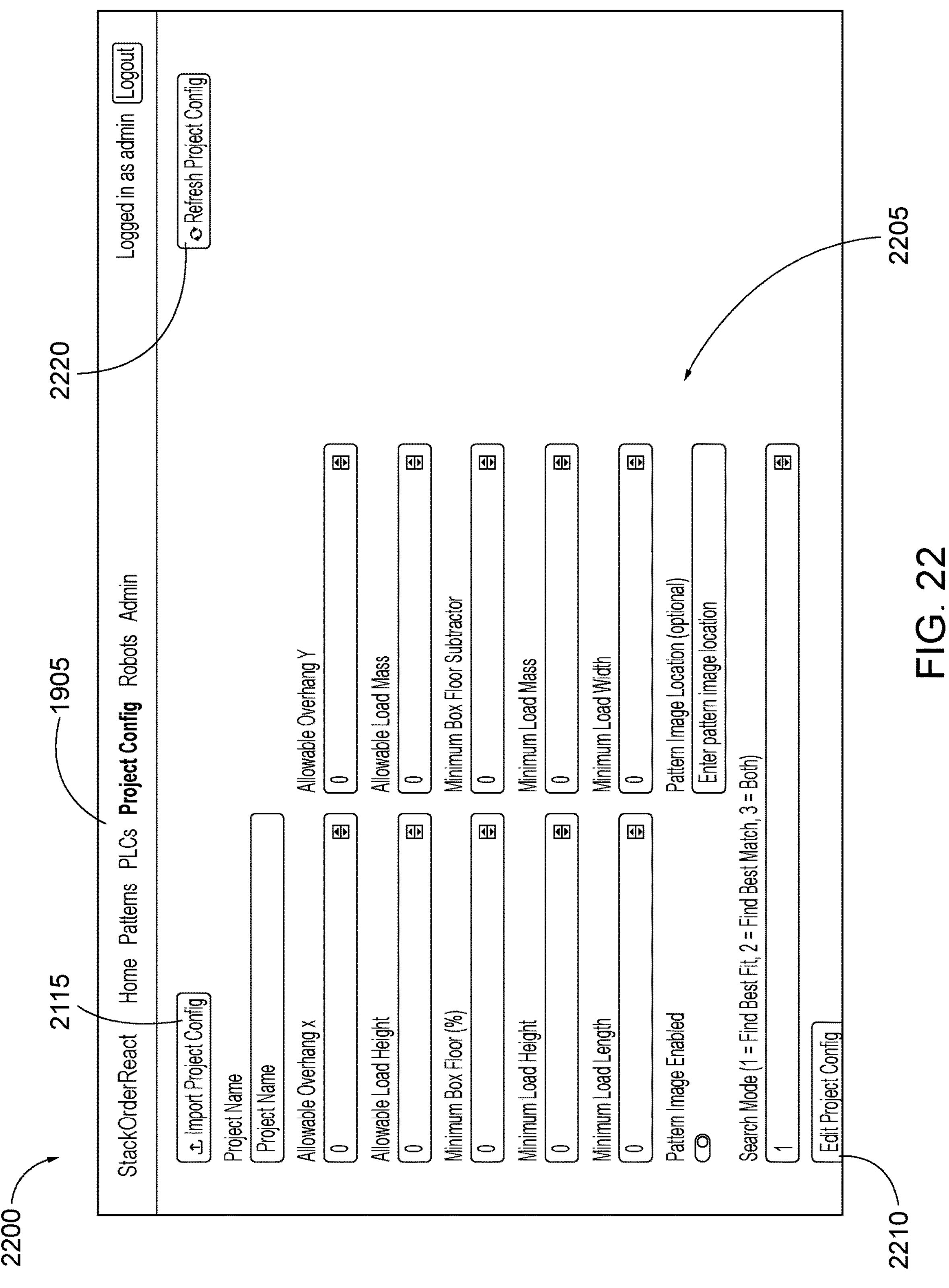
FIG. 22 is a screen rendering of a project configuration page displayed in the FIG. 18 system.

FIG. 21 shows an example of a PLC configuration page 2100 that can be shown via the web interface 1805 in the system 1800. Through the PLC configuration page 2100, the user is able to add and delete PLCs 142 in the system 1800. The user is also able to view information about the PLCs 142 in the system 1800. The PLC configuration page 2100 includes a PLC information area 2105 where the user can view information about and interact with the PLCs 142. The PLC information area 2105 includes individual PLC records. The PLC records for example can provide the IP addresses, program scopes, and nicknames of the PLCs 142 in the system 1800. The PLC records can further indicate if the PLC 142 is connected and/or if the PLC 142 has been recently pinged to check the connection. By clicking an add PLC button 2110 in the PLC configuration page 2100, the PLCs 142 can be added to the system 1800. Individual PLCs 142 can be deleted from the system 1800 by clicking a delete PLC button 2115 in the PLC configuration page 2100. The PLCs 142 can be further imported from files by clicking an import PLCs button 2120 in the PLC configuration page 2100. A refresh PLCs button 2125 in the PLC configuration page 2100 can be used to refresh the information in the PLC configuration page 2100.

The web interface 1805 further allows project information to be viewed and edited through a project configuration page 2200. The project configuration page 2200 has the menu bar 1905 for facilitating navigation between the various web pages. The project configuration information can be viewed and edited in a configuration form 2205 of the project configuration page 2200, and any changes can be saved by clicking an edit project button 2210 in the project configuration page 2200. The project configuration page 2200 has an import project button 2215 to import project configuration data from a file, and the project configuration page 2200 further has a refresh project button 2220 to refresh data on the project configuration page 2200.

Figure 23:
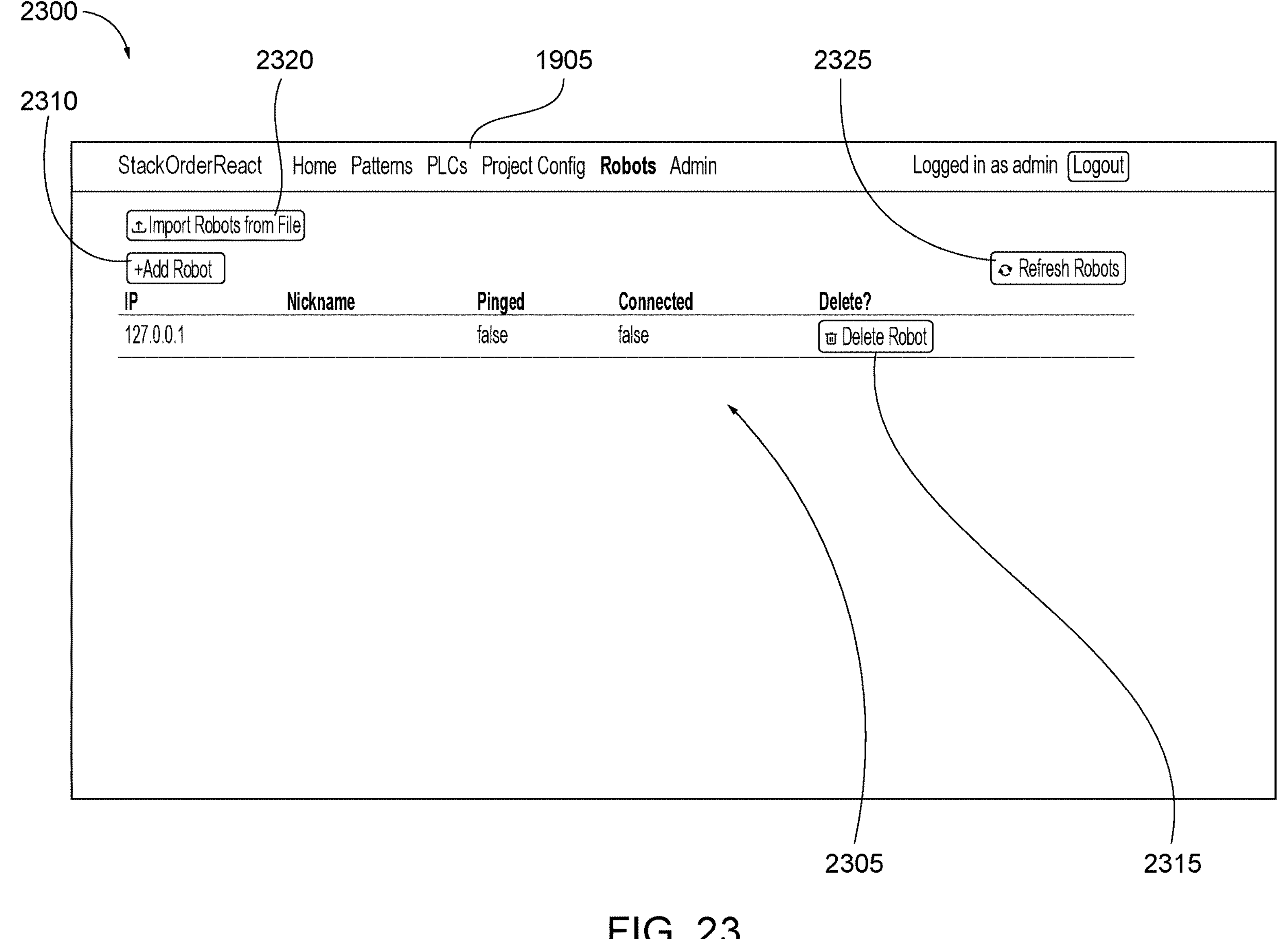
FIG. 23 is a screen rendering of a robot configuration page displayed in the FIG. 18 system.

FIG. 23 shows an example of a robot configuration page 2300 that can be shown via the web interface 1805 in the system 1800. Through the robot configuration page 2300, the user is able to add and delete robot arms 160 in the system 1800. The user is also able to view information about the robot arms 160 in the system 1800. The robot configuration page 2300 includes a robot information area 2305 where the user can view information about and interact with the robot arms 160. The robot information area 2305 includes individual palletizer or robot records. The robot records for example can provide the IP addresses and nicknames of the robot arms 160 in the system 1800. The robot records can further indicate if the robot arm 160 is connected and/or if the robot arm 160 has been recently pinged to check the connection. By clicking an add robot button 2310 in the robot configuration page 2300, the robot arms 160 can be added to the system 1800. Individual robot arms 160 can be deleted from the system 1800 by clicking a delete robot button 2315 in the robot configuration page 2300. The robot arms 160 can be further imported from files by clicking an import robots button 2320 in the robot configuration page 2300. A refresh robots button 2325 in the robot configuration page 2300 can be used to refresh the information in the robot configuration page 2300.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Barcode" generally refers to a visible arrangement of shapes, colors, lines, dots, or symbols fixed in some medium and arranged on the medium in a pattern configured to encode data. Examples include optical machine-readable representations of data relating to an object to which the barcode is attached such as a Universal Produce Code (UPC), or any visible patterns related to any type of Automatic Identification and Data Capture (AIDC) system. Another example of a barcode is a Quick Response Code (QR Code) which arranges various light and dark shapes to encode data. Any suitable medium is envisioned. Examples include an adhesive label, a physical page, a display device configured to display the barcode, or any other object such as a box, a machine, or other physical structure to which the barcode is affixed or upon which it is printed. For example, a bar code may be etched into metal, machined into plastic, or formed by organizing visible three-dimensional shapes into a pattern. The barcode may not be visible to humans but may be fixed using a substance or device that allows the barcode to be visible to sensors in a machine configured to read wavelengths of light outside those detectable by the human eye. Examples of this type of barcode include barcodes printed with ink that is only visible under ultraviolet (i.e., "black") light, or barcodes displayed using infrared light.

"Camera" generally refers to a device that records visual images. Typically, a camera may record two- and/or three-dimensional images. In some examples, images are recorded in the form of film, photographs, image signals, and/or video signals. A camera may include one or more lenses or other devices that focus light onto a light-sensitive surface, for example a digital light sensor or photographic film. The light-sensitive surface may react to and be capable of capturing visible light or other types of light, such as infrared (IR) and/or ultraviolet (UV) light.

"Communications Link" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum. A communication link may include any suitable combination of hardware which may include software components as well. Such hardware may include routers, switches, networking endpoints, repeaters, signal strength enters, hubs, and the like. In the case of a logical link, the communication link may be a conceptual linkage between the sender and recipient such as a transmission station in the receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Container" generally refers to an object creating a partially or fully enclosed space that can be used to contain, store, and transport objects, items, and/or materials. In other words, a container can include an object that can be used to hold or transport something. By way of non-limiting examples, containers can include boxes, cartons, plastic packaging, totes, bags, jars, envelopes, barrels, cans, bottles, drums, and/or packages.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Database", "Knowledge Base", "Data Store", or "Data Repository" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS. Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others. Examples of commercially available database management systems include PostgreSQL provided by the PostgreSQL Global Development Group; Microsoft SQL Server provided by the Microsoft Corporation of Redmond, Washington, USA; MySQL and various versions of the Oracle DBMS, often referred to as simply "Oracle" both separately offered by the Oracle Corporation of Redwood City, California, USA; the DBMS generally referred to as "SAP" provided by SAP SE of Walldorf, Germany; and the DB2 DBMS provided by the International Business Machines Corporation (IBM) of Armonk, New York, USA. The database and the DBMS software may also be referred to collectively as a "database". Similarly, the term "database" may also collectively refer to the database, the corresponding DBMS software, and a physical computer or collection of computers. Thus, the term "database" may refer to the data, software for managing the data, and/or a physical computer that includes some or all of the data and/or the software for managing the data.

"Display" or "Display Device" generally refers to any device capable of being controlled by an electronic circuit or processor to display information in a visual or tactile manner. A display device may be configured as an input device taking input from a user or other system (e.g., a touch sensitive computer screen), or as an output device generating visual or tactile information, or the display device may be configured to operate as both an input or output device at the same time, or at different times. The output may be two-dimensional, three-dimensional, and/or mechanical displays and includes, but is not limited to, the following display technologies: Cathode Ray Tube display (CRT), Light-Emitting Diode display (LED), Electroluminescent Display (ELD), electronic paper, Electrophoretic Ink (E-ink), Plasma Display Panel (PDP), Liquid Crystal Display (LCD), High-Performance Addressing display (HPA), Thin-film Transistor display (TFT), Organic Light-Emitting Diode display (OLED), Surface-conduction Electron-emitter Display (SED), laser TV, carbon nanotubes, quantum dot display, Interferometric Modulator Display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, and/or an array of red, yellow, and green indicators configured to indicate a temperature range.

"Forklift Truck", "Forklift", or "Fork Truck" generally refers to a vehicle with one or more prongs, blades, forks, or other parts that can be slid into or under loads and then raised or lowered in order to move and/or stack the loads. In a common arrangement, the forklift truck has two forks that can be slid into a pallet that carries a load. The forks are typically raised and lowered along a forklift mast. In certain designs, the mast and/or forks can be tilted so as to better retain the carried load. The forklift truck can be operated by a human operator, semi-autonomously controlled, or even fully autonomous. In one example of a fully autonomous design, the forklift truck is an Autonomously Guided Vehicle (AGV). Forklift trucks can be used in a wide variety of environments, such as in warehouses, lumberyards, manufacturing plants, and shipping depots, to name just a few examples. The forklift trucks can be powered in several manners, such as by using internal combustion engines (e.g., with liquefied petroleum gas, or LPG), via battery-electric powerplants, and/or hydrogen fuel cells. Some non-limiting forklift truck design types include low lift trucks, stackers, reach trucks, side loaders, order-picking trucks, guided very-narrow-aisle trucks, articulated counterbalance trucks, and omnidirectional trucks, to name just a few.

"Horizontal" generally refers to a plane and/or direction, which is parallel with the plane of the horizon. In another example, the horizontal plane and/or direction is at a right angle to a vertical plane or direction. An item that moves in the sideways (left to right) direction is generally said to move horizontally. For example, a lever fixed on one end to a rod that is able to move to the left and right is said to move horizontally. In yet another example, the slope of a horizontal line is 0.

"Input Device" generally refers to any device coupled to a computer that is configured to receive input and deliver the input to a processor, memory, or other part of the computer. Such input devices can include keyboards, mice, trackballs, and touch sensitive pointing devices such as touchpads or touchscreens. Input devices also include any sensor or sensor array for detecting environmental conditions such as temperature, light, noise, vibration, humidity, and the like.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Interface" or "Human-Machine Interaction (HMI)" generally refers to a computer, a smartphone, a tablet, and other computerized device or system where a user receives information and/or transmits commands. For instance, the interface can be a mechanism through which users can input information or commands and receive feedback or output from a system. In one example, the interface can be visual, such as a graphical user interface (GUI) displayed on a screen. In another example, the interface can be physical, such as buttons, switches, or knobs on a control panel. In a further example, the interface can be auditory, such as spoken commands and feedback, or haptic, such as vibrations or tactile feedback.

"Item" generally refers to an individual article, object, or thing. Commonly, but not always, items are handled in warehouse and material handling environments. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

"Lateral" generally refers to being situated on, directed toward, or coming from the side.

"Longitudinal" generally refers to the length or lengthwise dimension of an object, rather than across.

"Machine Learning" or "Machine Learning Algorithm" generally refers to a way of developing methods for performing tasks within artificial intelligence (AI) systems. Machine learning algorithms build models based on given sets of sample data. Using these models, a machine learning algorithm may make predictions or decisions about performing tasks and may improve the ability of an AI system to perform those tasks. Examples of machine learning include supervised learning, unsupervised learning, reinforcement learning, deep learning, and statistical learning. Machine learning algorithms can be implemented on a device, for example a computer or network of computers. Implementations of machine learning may also incorporate various types of models, including artificial neural networks, decision trees, regression analysis, Bayesian networks, gaussian processes, and/or genetic algorithms.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random-Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including Static Random Access Memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change RAM (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Network" or "Computer Network" generally refers to a telecommunications system that allows computers or other electronic devices to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Non-Dimensional Data" generally refers to data that has been normalized or scaled to remove the units of measurement so that the data is expressed in a dimensionless form. Non-dimensional data is typically used in engineering and scientific contexts to simplify calculations, facilitate comparisons, and generalize findings across different systems. In robotic palletization, non-dimensional data refers to the dimensional characteristics of the items being palletized that are expressed in terms of, for example, ratios or percentages, rather than absolute units of measurement. In this way, non-dimensional data allows the creation of standardized models that can be used across different types and sizes of items.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top, load deck upon which items are stacked, a bottom, support deck that rests on the ground, and a spacer structure positioned between the load and support decks to receive the forks of the forklift or pallet jack. However, the pallets can be configured differently. For example, the term pallet is used in a broader sense to include skids that have no support deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Palletizer" generally refers to a machine that automatically stacks and/or unstacks objects, such as cases of goods or other items, onto one or more pallets. Palletizers can include row-forming, in-line, and robotic type palletizers. In a row-forming type palletizer, cases or other objects are arranged in rows on a row forming area and then the rows of cases are moved onto a different area where a layer of cases is created. Once the layer is formed, the layer of cases are placed on the pallet. In-line type palletizers utilize a continuous motion flow divider that guides the cases or other objects into a target area on a layer forming platform. Robotic type palletizers have an end of arm tool (EoAT) or end effector that grabs the case or other object from a conveyor or layer table and then positions the case onto the pallet. The end of arm tool can accommodate a variation of pack patterns, package types, and package materials so as to allow the creation of mixed pallets that contain different products or other items.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, California. Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. An FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Programmable Logic Controller" or "PLC" generally refers to an electronic device used to control and automate industrial processes. A PLC can be programmed to control the movement of the palletizers, such as robotic arms, as well as the palletizing process. The PLC can receive data and/or signals from sensors and/or other devices and use that information to make decisions about what actions the palletizers should take. The PLC can be programmed to follow specific palletizing patterns and can adjust movements of the palletizers based on the weight, size, and shape of the items being palletized.

"Robot" generally refers to a machine, such as one programmable by a computer, capable of carrying out a complex series of actions automatically. Sometimes, but not always, the robot automatically performs complicated, often repetitive tasks. Occasionally, the robot resembles all or part of a living creature that is capable of moving independently and/or performing complex actions such as grasping and moving objects. A robot can be guided by an external control device, or the control may be embedded within the robot.

"Robotic Arm" or "Robot Arm" generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "End of Arm Tool" (EoAT) for holding, manipulating, or otherwise interacting with the cargo items or other objects. The EoAT can be configured in many forms besides what is shown and described herein.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Server" generally refers to a computer or group of computers that provide(s) data to other computers. It may serve data to systems on a local area network (LAN) and/or a wide area network (WAN) over the Internet.

"Stacking Pattern" generally refers to a specific arrangement of objects, such as cases, products, or other items, on a pallet. For example, the stacking pattern determines how the items are placed on the pallet, the orientation of the items, and the number of layers of the items in which the items are stacked. Sometimes, but not always, a stacking pattern can be designed to optimize the use of space on the pallet and ensure that the items are stable and secure during transportation. For instance, different stacking patterns may be used depending on the size, shape, weight, and/or fragility of the products being palletized, as well as the type of pallet and transportation method used. Common stacking patterns in robotic palletization include column stacking, interlocking stacking, block stacking, and spiral stacking.

"Vertical" generally refers to a plane and/or direction, which is perpendicular to the plan of the horizon. In another example, vertical is an alignment where the top is directly above the bottom. An item that moves upward or downward is generally said to move vertically. For example, an item that is able to move up and down is said to move vertically. In another example, the slope of a vertical line is undefined.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

100 system
110 database
113 server
115 memory
117 processor
120 controller
130 interface
140 palletizer
141 computer
142 PLC
143 network
145 stacking pattern
150 object
153 non-dimensional data
155 pallet
160 robot arm
180 case
200 pattern management interface
210 pattern management display setting area
220 pattern management results area
230 run button
240 CSV Test button
250 pattern image generation area
300 menu
310 file tab
320 tools tab
330 help tab
410 vertical placement
420 horizontal placement
430 pattern numeral
440 baseline edge mark
600 pop-up window
610 controller IP address display
620 component name
630 component IP address
640 controller tag
650 controller program name
700 pattern editing interface
710 pattern editing display area
720 editor mode function selection
730 viewing controls area
740 pallet frame orientation
800 small objects pattern example
900 large objects pattern example
1000 3D pattern graphic
1100 flowchart
1110 stage
1120 stage
1130 stage
1140 stage
1150 stage
1160 stage
1170 stage
1180 stage
1200 flowchart
1210 stage
1220 stage
1230 stage
1300 flowchart
1310 stage
1320 stage
1330 stage
1400 flowchart
1410 stage
1500 flowchart
1510 stage
1600 flowchart
1610 stage
1620 stage
1630 stage
1700 flowchart
1710 stage
1720 stage
1800 system
1805 web interface
1810 HMI
1900 dashboard page
1905 menu bar
1910 pattern display area
1915 history display area
2000 pattern editor page
2005 pattern editor bar
2010 pattern display area
2015 pattern edit area
2020 add new pattern button
2025 import patterns button
2030 export patterns button
2035 save pattern button
2100 PLC configuration page
2105 PLC information area
2110 add PLC button
2115 delete PLC button
2120 import PLCs button
2125 refresh PLCs button
2200 project configuration page
2205 configuration form
2210 edit project button
2215 import project button
2220 refresh project button
2300 robot configuration page
2305 robot information area
2310 add robot button
2315 delete robot button
2320 import robots button
2325 refresh robots button

What is claimed is:

1. A system, comprising:
a first palletizer configured to palletize a first set of first items having a first size;

a second palletizer configured to palletize a second set of second items having a second size that is different from the first size;

a database configured to maintain a stacking pattern library containing multiple stacking patterns for the palletizers;

wherein the database is configured to store the stacking patterns in the library as non-dimensional data;

a computer operatively connected to the database;

wherein the computer is configured to change receive first stacking requirements information for the first palletizer;

wherein the computer is configured to receive second stacking requirements information for the second palletizer;

wherein the computer is configured to select the same stacking pattern for the first palletizer and the other second palletizer based on the first stacking requirements information and the second stacking requirements information; and wherein the first palletizer and the second palletizer are configured to palletize using the same stacking pattern.

2. The system of claim 1, wherein the database is configured to maintain unique palletizer identifiers used for identifying individual palletizers.

3. The system of claim 2, wherein the palletizer identifiers include internet protocol (IP) addresses of the palletizers.

4. The system of claim 1, further comprising:

a controller that controls at least the first palletizer; and wherein the controller is configured to send the first stacking requirements information to the database.

5. The system of claim 1, wherein the computer is configured to automatically load the stacking pattern on the first palletizer.

6. The system of claim 5, wherein the stacking pattern is loaded on the first palletizer before building of a first pallet.

7. The system of claim 5, wherein the computer is configured to perform an overhang check for the stacking pattern before sending to the first palletizer.

8. The system of claim 5, wherein the computer is configured to perform an interference check for the stacking pattern before sending to the first palletizer.

9. The system of claim 1, wherein the computer is configured to update the stacking pattern library in the database in real-time.

10. The system of claim 1, wherein the computer is configured to maximize objects in an allowed volume for the stacking pattern.

11. The system of claim 1, wherein:

the computer is configured to allow automated pattern reference selection; and the database is configured to store a reference stacking pattern that is identified by an identifier in the database.

12. The system of claim 11, wherein the computer is configured to push the reference stacking pattern to a designated palletizer based on receiving the identifier for the stacking pattern from a user.

13. The system of claim 12, wherein the computer is configured to perform an interference check before pushing the reference stacking pattern to the designated palletizer.

14. The system of claim 12, wherein the computer is configured to perform an overhang check before pushing the reference stacking pattern to the designated palletizer.

15. The system of claim 12, further comprising:

a controller that controls at least the first palletizer;

wherein the controller is configured to transmit dimensional data to the computer;

wherein the computer is configured to select a best match stacking reference pattern from the stacking pattern library in the database;

wherein the computer is configured to send a reference pattern identifier for the best match stacking reference pattern to the controller; and wherein the controller is configured to transfer palletizing data to the first palletizer based on the reference pattern identifier.

16. A method, comprising:

receiving a first request for a first palletizer at a database;

storing stacking patterns in the database as non-dimensional data;

wherein the non-dimensional data represents relative characteristics of palletized items rather than absolute units of measure;

selecting a first stacking pattern from the database based on the first request;

sending the first stacking pattern from the database to the first palletizer;

palletizing at the first palletizer using the first stacking pattern;

receiving a second request for a second palletizer at the database;

selecting a second stacking pattern from the database based on the second request;

sending the second stacking pattern from the database to the second palletizer;

palletizing at the second palletizer using the second stacking pattern;

wherein the first stacking pattern and the second stacking pattern are the same; and wherein the palletizing at the second palletizer includes palletizing objects with a different size than at the first palletizer.

17. The method of claim 16, further comprising:

wherein the first request includes dimensional data; and selecting the first stacking pattern includes finding one or more patterns that best match the dimensional data.

18. The method of claim 16, further comprising:

sending the first request from a controller for the first palletizer to the database;

receiving the first stacking pattern from the database at the controller; and controlling operation of the first palletizer with the controller based on the first stacking pattern.

19. The method of claim 18, further comprising:

detecting abnormal communication with the controller; and entering a test mode upon the detecting abnormal communication.

20. The method of claim 18, wherein the sending the first stacking pattern includes returning a reference pattern identifier to the controller.

21. The method of claim 16, further comprising:

providing interim and/or final results for the first stacking pattern at a first interface; and modifying the first stacking pattern based on user input from the interim and/or final results.

22. The method of claim 16, further comprising:

performing a preliminary pattern check of the first stacking pattern; and performing the preliminary pattern check includes checking for overhang and/or interference in the first stacking pattern.

* * * * *